US012602307B2

(12) United States Patent
Ostrowski et al.

(10) Patent No.: US 12,602,307 B2
(45) Date of Patent: Apr. 14, 2026

(54) ROOT CAUSE DETECTION OF STRUGGLE EVENTS WITH DIGITAL EXPERIENCES AND RESPONSES THERETO

(71) Applicant: U.S. Bancorp, National Association, Minneapolis, MN (US)

(72) Inventors: Stephanie M. Ostrowski, Portland, OR (US); Michelle L. Clark, Owensboro, KY (US); Thomas W. Malowney, Minneapolis, MN (US); Amrita Deo, Fairfield, CA (US); Nathan M. Mertz, Minneapolis, MN (US); John W. Harasyn, Minneapolis, MN (US)

(73) Assignee: U.S. Bancorp, National Association, Minneapolis, MN (US)

( * ) Notice: Subject to any disclaimer, the term of this patent is extended or adjusted under 35 U.S.C. 154(b) by 318 days.

(21) Appl. No.: 18/583,588

(22) Filed: Feb. 21, 2024

(65) Prior Publication Data

US 2025/0156302 A1 May 15, 2025

Related U.S. Application Data

(60) Provisional application No. 63/598,586, filed on Nov. 14, 2023.

(51) Int. Cl.
*G06F 11/36* (2025.01)
*G06F 11/3604* (2025.01)
(52) U.S. Cl.
CPC ................................ *G06F 11/3604* (2013.01)

(58) Field of Classification Search
CPC ............................. G06F 11/36; G06F 11/3604
See application file for complete search history.

(56) References Cited

U.S. PATENT DOCUMENTS

| 12,474,892 | B2 * | 11/2025 | Carrara | ..................... | G06F 8/33 |
| 2011/0279359 | A1 * | 11/2011 | McCarty | .......... | H04N 21/42203 |
| | | | | | 345/156 |
| 2011/0283189 | A1 * | 11/2011 | McCarty | ........... | H04N 21/4532 |
| | | | | | 715/810 |
| 2019/0132190 | A1 * | 5/2019 | Jeyakumar | .......... | H04L 41/0631 |
| 2019/0260818 | A1 * | 8/2019 | Ciabarra, Jr. | ....... | G06F 11/0709 |
| 2021/0006653 | A1 * | 1/2021 | Kulkarni | ............. | H04M 3/5175 |
| 2021/0176294 | A1 * | 6/2021 | Ciabarra, Jr. | ....... | H04L 43/0852 |
| 2021/0311815 | A1 * | 10/2021 | Yuvaraj | ................... | H04L 41/22 |
| 2022/0334906 | A1 * | 10/2022 | Patil | .................... | G06F 11/3438 |
| 2023/0297456 | A1 * | 9/2023 | Ciabarra, Jr. | ......... | H04L 67/535 |
| | | | | | 714/38.1 |
| 2024/0143426 | A1 * | 5/2024 | Kumar | ................ | G06F 11/0787 |
| 2024/0406246 | A1 * | 12/2024 | Boudreau | ........... | G06F 3/04847 |
| 2025/0356725 | A1 * | 11/2025 | Nowak | ............... | G07F 17/3225 |

* cited by examiner

*Primary Examiner* — Anil K Bhargava
(74) *Attorney, Agent, or Firm* — FOLEY & LARDNER LLP

(57) ABSTRACT

A diagnostic platform is configured to identify friction with a technology product or digital experience. The platform can be configured to improve the functioning of the digital experience by identifying requests from a user device (e.g., indicative of user input received at a user device) indicative of the user struggling with an aspect of the digital experience provided by a server. A friction associated with the struggling is then identified and remediated.

19 Claims, 16 Drawing Sheets

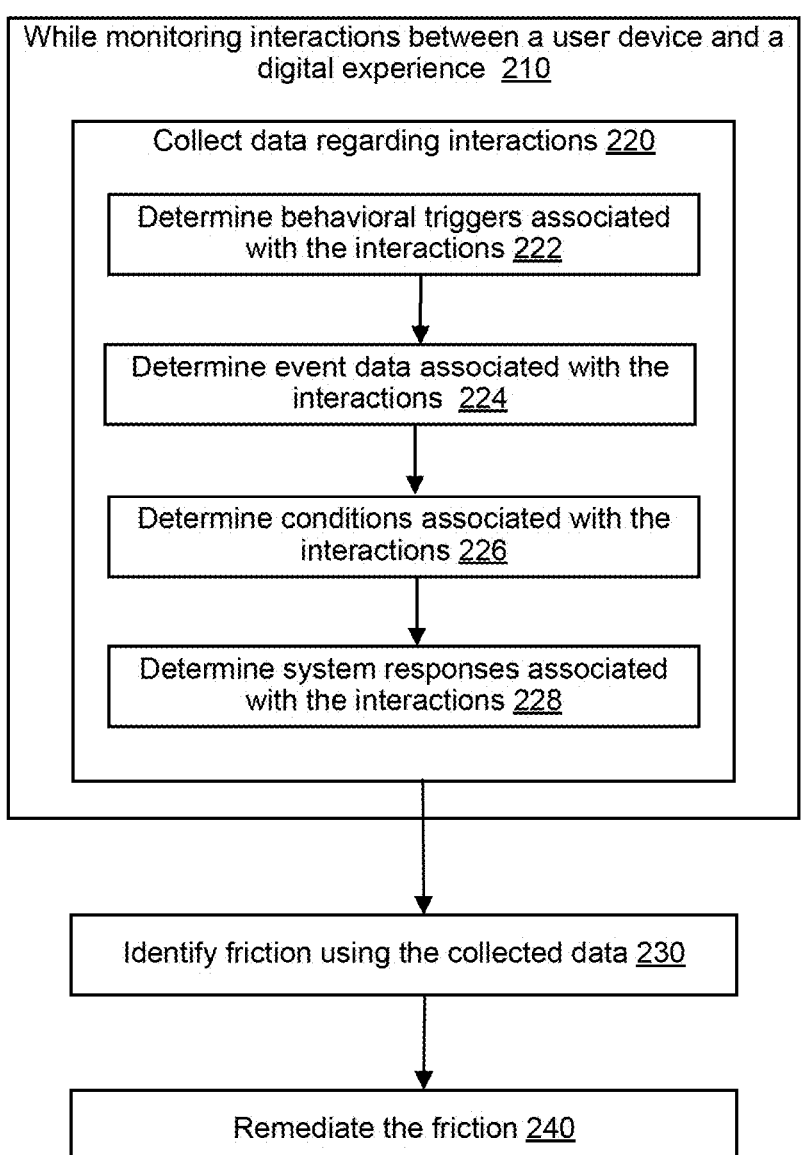

200

While monitoring interactions between a user device and a digital experience  210

Collect data regarding interactions 220

Determine behavioral triggers associated with the interactions 222

Determine event data associated with the interactions 224

Determine conditions associated with the interactions 226

Determine system responses associated with the interactions 228

Identify friction using the collected data 230

Remediate the friction 240

Event: OLB Task | billpay

Clicked: BUTTON[primary-reviewpay-total-btn]

URL = onlinebanking.usbank.com/digital/servicing/account-dashboard

Tealium Product Code = MAL

ERROR
Can be any or combo

Possible Frustration

Frustration Input

Rage Click

Long Running Spinner

Error: Payment Fail – Open Bill Pay | FAILED

FIG. 4

Event: Smart Assistant – How can we help you

Clicked: INPUT[input-1415926535897]

URL = onlinebanking.example.com/digital/servicing/acct-dashboard

Tealium Product Code = MAL

Event: Customer Struggle – No Smart Assistant Responses

FIG. 5

Event: OLB Task | billpay

Clicked: Make a payment, My accounts, Choose an account, Mortgage - XXXX

URL = onlinebanking.example.com/digital/servicing/acct-dashboard

Tealium Product Code = MAL

ERROR
Can be any or combo

Possible Frustration

Frustration Input

Rage Click

Long Running Spinner

MISSING Click Activity: Submit Payment

610

Make a payment.

○ Loan ...
  Due October 11

Pay this amount

◉ Minimum payment   $     `input[checkbox-groupChoice1]` ⟶ 612

○ Total current balance   $     `input[checkbox-groupChoice2]` ⟶ 612

○     `input[checkbox-groupChoice3]` ⟶ 612

○ `input[input_USBBPPC- -1]` ⟶ 612

◉ Other amount     `input[checkbox-groupChoice4]` ⟶ 612
  `input[input_USBBPPC- -2]` ⟶ 612

Set details

Deliver by
October 11, 2023     `DIV[date-input-container]` ⟶ 612

Pay from          612
Checking ...     `input[input_USBBPPC- -3]` ⟶

620

| Digital Loan (SLN) Payments 2 | | |
|---|---|---|
| *Conditions & Event Data apply to each Struggle Algorithm* | Event: OLB Task \| billpay | |
| | URL= https://onlinebanking.example.com/digital/moneymovement/openbillpay/makeapayment | |
| | Event AA Account Type \| SLN *<sub product code>* | |
| *Struggle 1 (groupChoice1-4)* | | *Struggle 2 (input_USBBPP- -1-3)* |
| Clicked: INPUT[checkbox-groupChoice<1-4>] | | Clicked: INPUT[input_USBBPPC- -<1-3>] |
| AND/OR | Error: Possible Frustration \| checkbox-group | AND/OR | Error: Rage Click \| INPUT[input_USBBPPC- -<1-3>] |
| | Error: Rage Click \| checkbox-group | | Error: Input Field Frustration \| INPUT[input_USBBPPC- -<1-3>] |
| | Error: Input Field Frustration \| checkbox-group | | Error: Possible Frustration \| INPUT[input_USBBPPC- -<1-3>] |
| *Struggle 3 (date picker)* | | |
| Clicked: DIV[date-input-container] | | |
| AND/OR | Error: Possible Frustration \| checkbox-group | |
| | Error: Rage Click \| checkbox-group | |

Figures 11A, 11B:
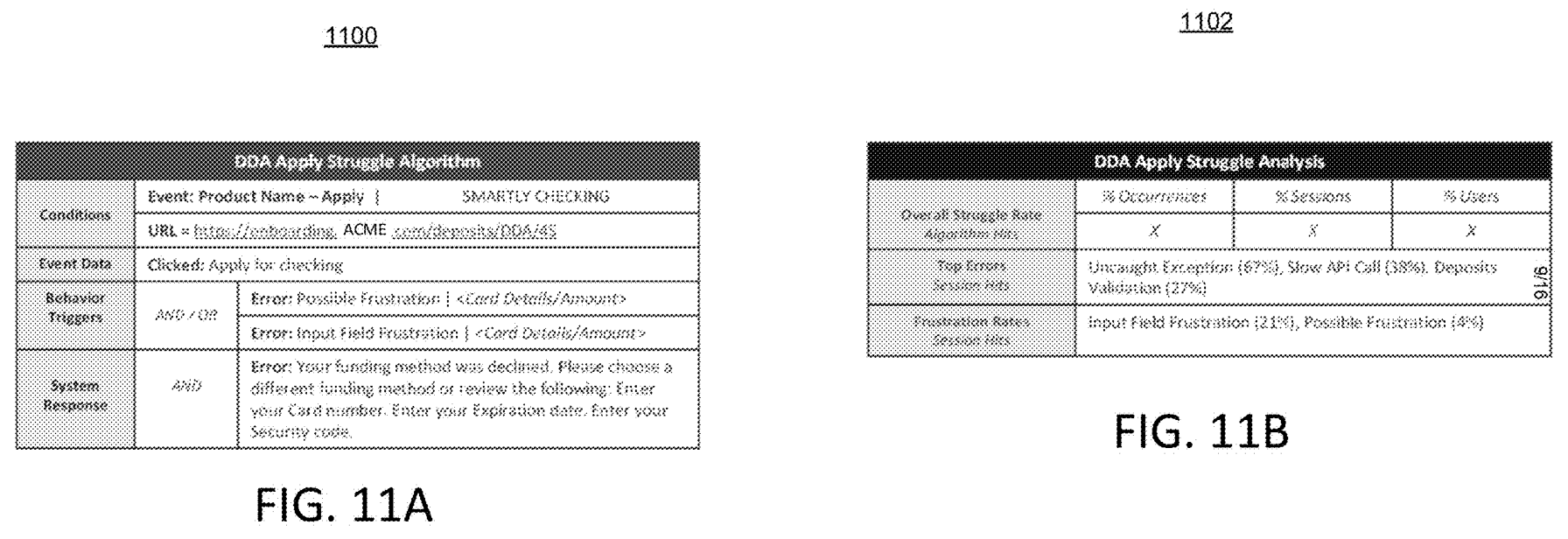

| DDA Apply Struggle Analysis | | | |
|---|---|---|---|
| | % Occurrences | % Sessions | % Users |
| | X | X | X |
| Overall Struggle Rate (application) | | | |
| Top Errors (session) | Unclaught Exception (67%), Slow API Call (38%), Deposits Validation (27%) | | |
| Transition Rates (session) | Input Field Frustration (3.1%), Possible Frustration (4%) | | |

| DDA Apply Struggle Algorithm | | |
|---|---|---|
| Conditions | Event: Product Name ~ Apply | SMARTLY CHECKING |
| | URL = https://interactive. ACME .com/deposits/DDA-45 | |
| Event Data | Clicked: Apply for checking | |
| Behavior Trigger | AND / OR | Error: Possible Frustration | <Card Details/Amount> |
| | | Error: Input Field Frustration | <Card Details/Amount> |
| System Response | AND | Error: Your funding method was declined. Please choose a different funding method or review the following: Enter your Card number. Enter your Expiration date. Enter your Security code. |

Forced = User is "forced" from completing a desired task due to receiving an error and/or experiencing an unexpected action.

Struggle event details: Error message, frustrated input, rage click

Deferred = User is "deferred" from completing a desired task due to experiencing confusion and/or doesn't complete an expected step.

Struggle event details: Predictive intent does not occur, page/field stagnation, errors

Knowledge = User "lacks knowledge" to complete a desired task and fails attempt to obtain information via DIY method to achieve action.

Struggle event details: Attempts DIY Channel, page/field stagnation, error message

Struggle Types

Figure 15:
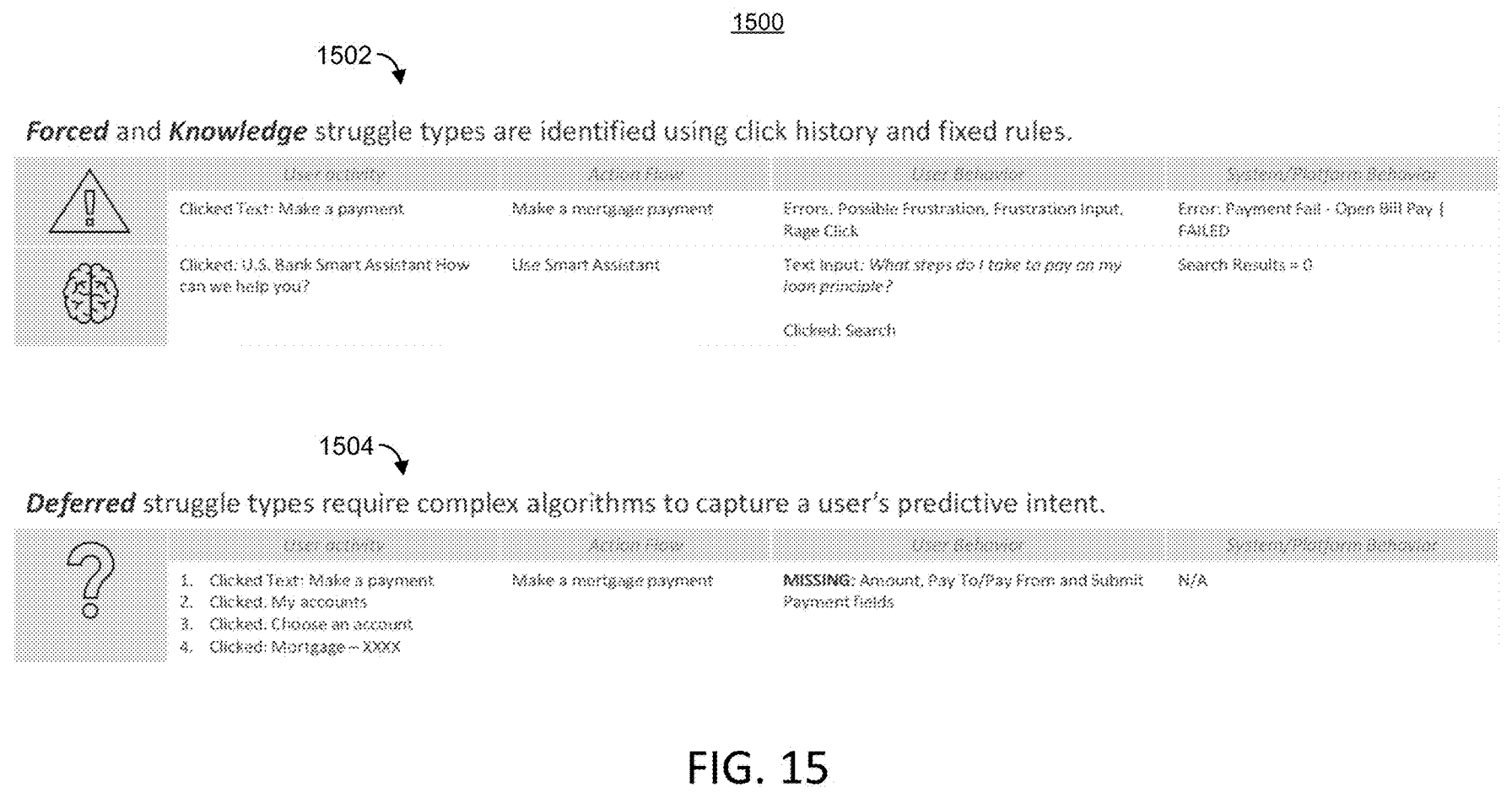

*Forced* and *Knowledge* struggle types are identified using click history and fixed rules.

1504

*Deferred* struggle types require complex algorithms to capture a user's predictive intent.

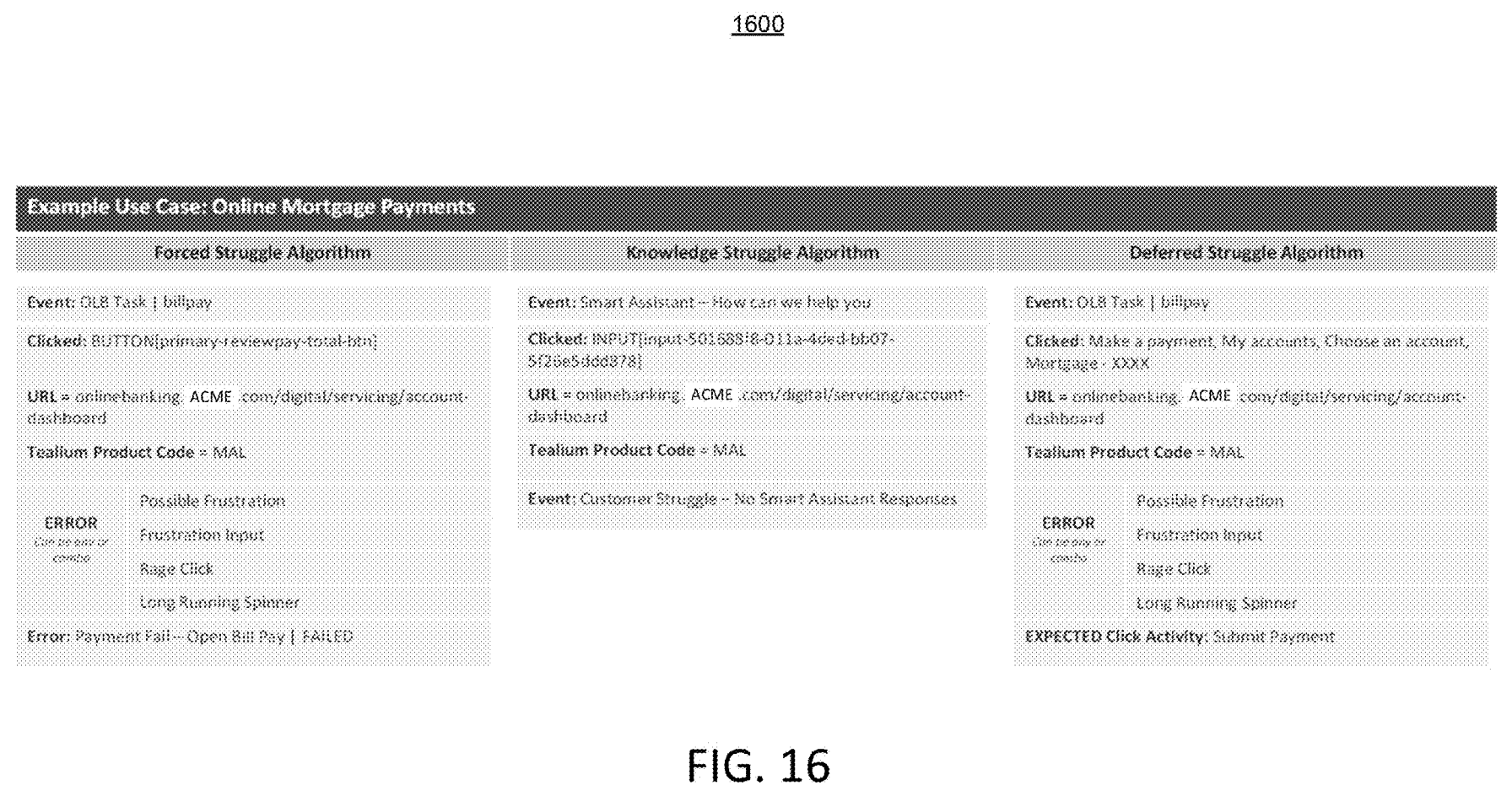

Example Use Case: Online Mortgage Payments

Forced Struggle Algorithm

Event: OLB Task | billpay

Clicked: BUTTON[primary-reviewpay-submit-btn]

URL = onlinebanking. ACME .com/digital/servicing/account-dashboard

Tealium Product Code = MAL

ERROR [an error code]
    Possible Frustration
    Frustration Input
    Rage Click
    Long Running Spinner Error: Payment Fail – Open Bill Pay | FAILED

Knowledge Struggle Algorithm

Event: Smart Assistant – How can we help you

Clicked: INPUT[input-SQ150518-011a-46e3-bb07-5f2be54fdd3778]

URL = onlinebanking. ACME .com/digital/servicing/account-dashboard

Tealium Product Code = MAL

Event: Customer Struggle – No Smart Assistant Responses

Deferred Struggle Algorithm

Event: OLB Task | billpay

Clicked: Make a payment, My accounts, Choose an account, Mortgage: XXXX

URL = onlinebanking. ACME .com/digital/servicing/account-dashboard

Tealium Product Code = MAL

ERROR [an error code]
    Possible Frustration
    Frustration Input
    Rage Click
    Long Running Spinner EXPECTED Click Activity: Submit Payment

FIG. 16

ROOT CAUSE DETECTION OF STRUGGLE EVENTS WITH DIGITAL EXPERIENCES AND RESPONSES THERETO

CROSS-REFERENCE TO RELATED APPLICATIONS

This application claims the benefit of priority to U.S. Provisional Patent Application No. 63/598,586, filed Nov. 14, 2023, the entirety of which is incorporated by reference herein.

BACKGROUND

Users of applications, websites, and other digital experiences may struggle to complete tasks for a variety of reasons. The digital experience may be slow, unresponsive, confusing, broken, buggy, have other problems, or a combinations of problems. Traditionally, such struggling is detected through customer feedback surveys, interviews, or user experience testing. However, such approaches are expensive, slow, and time consuming. Providers of such applications or websites themselves struggle to determine in a timely and effective manner that users are struggling and that the website or application is having issues.

BRIEF DESCRIPTION OF THE DRAWINGS

FIG. 2 illustrates an example method for diagnosing issues from user input, in accordance with an implementation;

FIG. 3 illustrates an example forced struggle and associated data, in accordance with an implementation;

FIG. 4 illustrates an example knowledge struggle and associated data, in accordance with an implementation;

FIG. 5 illustrates an example deferred struggle and associated data, in accordance with an implementation;

FIG. 6 illustrates an example mapping of a digital experience screen with potential struggles and associated data region, in accordance with an implementation;

FIG. 11A illustrates an example template for struggle event detection, in accordance with an implementation;

FIG. 11B illustrates an example analysis of struggle events detected using the systems and methods described herein, in accordance with an implementation;

FIG. 12 illustrates an example sequence for root cause detection and remediation of struggle events with digital experiences, in accordance with an implementation;

FIG. 14 illustrates example struggle types, in accordance with an implementation;

FIG. 15 illustrates example templates for detecting different struggle types, in accordance with an implementation;

FIG. 16 illustrates example templates for detecting different struggle types, in accordance with an implementation;

FIG. 18 illustrates an example machine learning framework that techniques described herein may benefit from.

DETAILED DESCRIPTION

Figure 1:
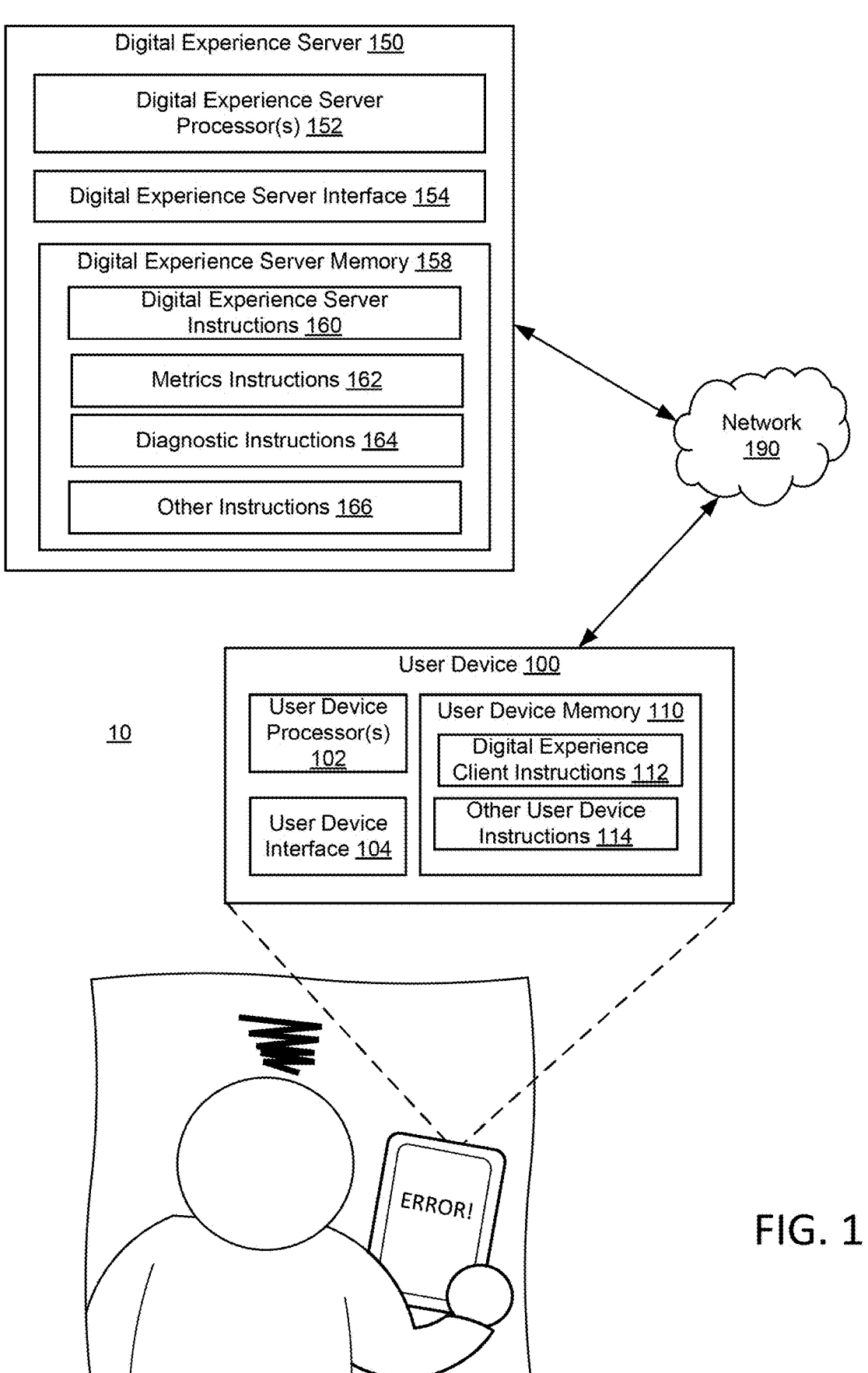
FIG. 1 illustrates an example system that includes a user device interacting with a digital experience server over a network to provide a digital experience to a user, in accordance with an implementation.

This disclosure includes an example diagnostic platform configured to identify friction with a technology product or digital experience. The diagnostic platform can be implemented as a server based micro-service. In an example, the platform includes functions that produce analytic outcomes that strike a balance between capturing data of predefined processes and contextual understanding of human behavior based on received input. In examples, the diagnostic platform uses behavior science and technology to improve the functioning of the digital experience by identifying requests from a user device (e.g., indicative of user input received at the user device 100) indicative of the user struggling with an aspect of the digital experience.

The diagnostic platform can use metrics to determine insights into the struggles, which then drive actions to improve the digital experience. The platform can discover potential issues through idea discovery and definition, then those issues can be remediated through, for example, a process of designing and building a solution. The digital experience can then be incremented upon or experimented with to deliver improvements.

In some examples, the diagnostic platform can use or leverage large language models. For instance, there can be a combination of a conversational artificial intelligence, an ecosystem of past user interactions and preferences (e.g., input to the diagnostic platform), which can then be used to build and deploy artificial intelligence models. In addition or instead, large language models can be prompted to provide output summarizing a user interaction with a digital experience or an output including a recommended change to the digital experience to ameliorate the struggle.

There can be any of a variety of different kinds of struggles to be detected. Generally, a struggle is behavioral trigger or is associated with a behavior trigger in which a user's intended action is not completed and may be paired with (or caused by) any number of frustration events, such as: long running spinners, frustration input, rage clicks, error messages, slow navigation, and page/field stagnation. A forced struggle can be indicative of a situation in which the user is forced from completing a task due to experiencing an unexpected action (e.g., an error message). A knowledge struggle can be a struggle in which the user lacks knowledge to complete a task and fails an attempt to obtain information via a self-help method (e.g., using a do-it-yourself method to obtain help, such as using a virtual assistant or help center) to complete the desired action. A deferred struggle can be a struggle in which the user is deferred from completing a task because the user experiences confusion (e.g., a predictive intent does not occur).

Forced struggles and knowledge struggles can be identified using, for example, click history and fixed rules. In an example, user input is received for actuating a "make a payment" button to make a mortgage payment. Next, user input is received that indicates frustration (e.g., frustration input or rage clicks), and that input may be received near in time to the server having an error, such as "Payment fail-open bill pay failed". This can be classified as a forced struggle. In another example, user input is received indicating that a user actuated a virtual assistant button to use an assistant (e.g., U.S. BANK SMART ASSISTANT). Next, the server receives user input indicating that the user wants to search "what steps do I take to pay on my loan principle", but the server returns zero search results. This can be classified as a knowledge struggle in which a user lacks knowledge to complete the task (e.g., lacks knowledge of how to pay a loan principle and what to search to find out). In addition or instead, the knowledge struggle can encompass the user lacking knowledge and the digital experience lacking the ability to educate the user. Deferred struggles can be difficult to detect and may require more complicated functionality to detect. For example, user input may be received that actuates a button for making a mortgage payment, the server provides fields for obtaining information, user input is received for "from" and "to" fields but is not received for an "amount" field. User input is not received to actuate a "submit payment" button, and the session ends. In such an instance, the user may have wanted to make the payment but lacked knowledge of the amount to be paid and so the user terminated the session early.

In an example, the frustration is detected from an automated or manual viewing of a session replay. In an example session replay, the following events may occur and be summarized:

| | |
|---|---|
| 16:33 | Make a payment single screen > Error: Payment Fail |
| 17:39 | Account Dashboard > Possible Frustration: $0.00 |
| 18:14 | Account Dashboard > Clicked: Make a payment, then forced logged out Reattempt at 25:00 |
| 25:27 | Make a payment single screen > Possible Frustration: Other amount |
| 25:47 | Make a payment single screen > Input Field Frustration: USBBPPC- |
| 26:08 | Payment Success |

Struggle Event Detection
System

FIG. 1 illustrates an example system 10 that includes a user device 100 interacting with a digital experience server 150 over a network 190 to provide a digital experience to a user. The digital experience can be a logical set of electronic interactions between a user and an entity to fulfill a purpose, the electronic interactions being facilitated through communication between the user device 100, the digital experience server 150, and one or more other devices. Digital experiences are broad and examples include: interacting with a financial institution (e.g., engaging in a financial transaction, checking a balance, or taking other actions), interacting with a social networking site (e.g., reading or posting content), interacting with a communication channel (e.g., sending or receiving messages, such as instant messages or emails), interacting with a retail site, obtaining information from a site, playing an electronic game (e.g., playing an offline or online video game), other interactions or combinations thereof.

In many examples herein, the digital experiences are provided by a server 150, though they need not be. For instance, the digital experience may occur primarily or exclusively on the user device 100. In such instances, a person of skill in the art would understand how to modify language referring to the server 150 to instead, as appropriate, be reinterpreted to encompass the interaction journey in which the digital experience in question is being provided by a single device.

The user device 100 is a device used by a user that interacts with the digital experience server 150 over the network 190 to provide a digital experience to the user. The user device 100 can include one or more aspects described elsewhere herein such as in reference to the computing environment 1700 of FIG. 17. In many examples, the user device 100 is a personal computing device, such as a smart phone, tablet, laptop computer, or desktop computer. But the device 100 need not be so limited and may instead encompass other devices used by a user as part of a digital experience. In the illustrated example, the user device 100 can include one or more user device processors 102, one or more user device interfaces 104, and user device memory 110, among other components.

The one or more user device processors 102 are one or more components of the user device 100 that execute instructions, such as instructions that obtain data, process the data, and provide output based on the processing. The one or more user device processors 102 can include one or more aspects described below in relation to the one or more processors 1712 of FIG. 17.

The one or more user device interfaces 104 are one or more components of the user device 100 that facilitate receiving input from and providing output to something external to the user device 100. The one or more user device interfaces 104 can include one or more aspects described below in relation to the one or more interfaces 1718 of FIG. 17.

The user device memory 110 is a collection of one or more components of the user device 100 configured to store instructions and data for later retrieval and use. The user device memory 110 can include one or more aspects described below in relation to the memory 1714 of FIG. 17. The user device memory 110 can store digital experience client instructions 112 and other user device instructions 114.

The digital experience client instructions 112 are a set of instructions that, when executed by one or more of the one or more user device processors 102, cause the one or more user device processors 102 to provide digital experience client functionality. For instance, the instructions 112 can be those of a mobile application (e.g., that may be obtained from a mobile application store, such as the APPLE APP STORE or the GOOGLE PLAY STORE). The mobile application can provide a user interface for receiving user input from a user and acting in response thereto. Such a response can include providing data indicative of or based on the user input to the digital experience server 150 over the network 190 (e.g., using an application programming interface thereof). The user interface can further provide output to the user. In some examples, the digital experience client instructions 112 are instructions 112 that cause a web browser of the user device 100 to render a web page associated with the digital experience. The web page may present information to the user and be configured to receive input from the user and take actions in response thereto.

The other user device instructions 114 are other instructions that may be present on the user device 100. Examples of such instructions include operating system instructions.

The digital experience server 150 is a server device that functions as part of a digital experience, such as by receiving user input over the network and providing responses thereto. In the illustrated example, the digital experience server 150 includes one or more digital experience server processors 152, one or more digital experience server interfaces 154, digital experience server memory 158, among other components.

The one or more digital experience server processors 152 are one or more components of the digital experience server 150 that execute instructions, such as instructions that obtain data, process the data, and provide output based on the processing. The one or more digital experience server processors 152 can include one or more aspects described below in relation to the one or more processors 1712 of FIG. 17.

The one or more digital experience server interfaces 154 are one or more components of the digital experience server 150 that facilitate receiving input from and providing output to something external to the digital experience server 150. The one or more user digital experience server interfaces 154 can include one or more aspects described below in relation to the one or more interfaces 1718 of FIG. 17.

The digital experience server memory 158 is a collection of one or more components of the digital experience server 150 configured to store instructions and data for later retrieval and use. The digital experience server memory 158 can include one or more aspects described below in relation to the memory 1714 of FIG. 17. The digital experience server memory 158 can store digital experience server instructions 160, metrics instructions 162, diagnostic instructions 164, and other instructions 166.

The digital experience server instructions 160 are instructions that, when executed by the one or more processors 152, cause the one or more processors 152 to provide functionality related to the digital experience. Such functionality can include receiving data from clients (e.g., an application running on the user device 100 by executing the digital experience client instructions 112), processing the data, and communicating based on the processing. As discussed above, the digital experience can take any of a variety of forms, and the instructions 160 can likewise be configured to achieve that form.

The metrics instructions 162 are instructions that, when executed by the one or more processor 152, cause the one or more processors to produce metrics data regarding the digital experience. These metrics can include the ways in which clients interact with the digital experience. In some examples, the metrics instructions 162 cause the creation or analysis of a log of interactions as part of the digital experience. In some examples, the metrics instructions include bespoke metrics or analysis functions. In addition or instead, the metrics can include plugins, functions, or features from established metrics, analysis, or observability software and services, such as SITECATALYST by ADOBE, GRAIL by DYNATRACE, FULLSTORY by FULLSTORY, and products provided by HOTJAR and QUANTUM METRIC.

The diagnostic instructions 164 are instructions that, when executed by the one or more processors 152, cause the one or more processors 152 to implement one or more aspects of the diagnostic platform described herein.

The other instructions 166 include other instructions of the server 150 that, when executed by the one or more server processors 152, cause the one or more server processors 152 to implement one or more aspects selected from: load balancing, operating system, resource management (e.g., load balancing), backup tools, diagnostic tools, virtual machine tools, other tools, or combinations thereof.

The network 190 is a set of devices that facilitate communication from a sender to a destination, such as by implementing communication protocols. Example networks 190 include local area networks, wide area networks, intranets, or the Internet.

Computing Environment

FIG. 2 illustrates a method 200 for diagnosing issues from user input. The method can begin with operation 210.

Operation 210 can include performing one or more actions while monitoring interactions between a user device 100 and digital experience, such as through the digital experience server 150. For example, the server 150 can receive requests or user input from the user device 100 (e.g., a digital experience client running thereon), process such requests or input and provide responses thereto, such as by running the digital experience server instructions 160. The monitoring of the interactions can be performed using one or more aspects of the digital experience server instructions 160, the digital experience client instructions 112, the metrics instructions 162, other instructions or devices, or combinations thereof. In some examples, the monitoring occurs in real time as users interact with the server 150 via respective user devices 100. In other examples, monitoring does not occur in non-real time and is, for example, based on future review of logs or recordings of user sessions.

Operation 210 can include operation 220, which can include collecting data regarding the interactions. For instance, one or both the server 150 and the user device 100 can run instructions configured to collect Document Object Model (DOM) events (e.g., signals that something has occurred or is occurring and can be triggered by user interactions received by a browser or application). The software can be configured to recreate mouse movements or other user inputs and steps of the interaction with the digital experience. In an example, such instructions can be part of the metrics instructions 162. Operation 210 includes operations 222, 224, 226, and 228.

Operation 222 includes determining behavioral triggers associated with the interactions. For example, a behavior trigger can be a behavior by the user (e.g., as determined based on user input or requests received from the user device 100) or the server 150 that triggers further action. Examples of behavior triggers traditionally detected by a variety of metrics services known in the art include rage clicks, possible frustrations, input field frustration, page stagnation (e.g., a page not changing, such as in response to input), field stagnation (e.g., a field not changing, such as in response to input), excessive reloads, profane input, shaking the device (e.g., as detected by accelerometer data), other behavior triggers, or combinations thereof. In an example, a definition of a rage click according to one or more metrics in the art can include more than a predetermine number of clicks or taps within a predetermined area of an element, within a predetermined amount of time despite a change occurring on a page in response to one or more of the clicks. In another example, a definition of a possible frustration detectable by a metric known within the art is more than a predetermined number of clicks within a predetermined amount of time on an element without a corresponding change on the page.

In some examples, the behavior triggers are indications of actions taken by the user (e.g., as determined based on user input received or requests received from the client). Examples include detecting clicks, taps, swipes, pinches, highlighting text, keyboard input, mouse input, other actions or input, or combinations thereof. In some examples, the behavior triggers also specify which element was interacted with. For example, the behavior triggers can include "clicked text: make a payment", "clicked: Smart Assistant", "clicked-choose an account", "clicked-Mortgage", others or combinations thereof. The behavior triggers can also specify the nature of that interaction (e.g., a number of clicks in a particular area).

Behavior triggers can be determined based on output from a metrics process that monitors the interactions with the digital experience. An example metrics process can monitor user input received (or can infer user input from requests sent from the client). Such user input can be monitored and labeled according to whether it corresponds to a behavior trigger.

Following operation 222, the flow of the method can move to operation 224.

Operation 224 includes determining event data associated with the interactions, such as specifically associated with the behavior trigger of operation 222. Event data can include information regarding events within the interaction. Event data can include items such as a current page name, a user flow activity, a user click activity, other event data, or combinations thereof. Event data can describe a sub-product or service within the digital experience. Specific examples can include: "Product Name—Apply", "Task—Billpay", and "Smart Assistant—How can we help you", "Task Purchase", "Task—Post", or "Task—Live stream", among others. Event data can include descriptions of an action flow associated with user activity or behavior triggers, such as making a mortgage payment or using a smart assistant, among others. In an example, determining the event data associated with the interactions is performed by reading event data from metrics logs.

Following operation 224, the flow of the method can move to operation 226.

Operation 226 includes determining conditions associated with the interactions, such as specifically associated with the behavior trigger of operation 222. Example conditions can include metadata of the interaction, such as product codes, timestamps, and URLs (Uniform Resource Locators) associated with the interaction or behavior trigger. In an example, determining the conditions can include loading or interpreting conditions from the metrics. Following operation 226, the flow of the method can move to operation 228.

Operation 228 includes determining system responses associated with the interactions, such as specifically associated with the behavior trigger of operation 222. Example system responses can be an error message, loading data, updating a portion of a user interface, other actions or combinations thereof. The system responses can include one or both of responses above the glass (e.g., visible to the user, such as an error message displayed to the user) and below the glass (e.g., internal error messages, internal subroutines, internal logs, or other internal processes that occurred in response but are not typically visible to the user). An example error message is: "Your funding method was declined. Please choose a different funding method or review the following: Enter your card number. Enter your expiration date. enter your security code." In an example, the system responses are loaded from logs.

Following operation 220, the flow of the method can move to operation 230.

Operation 230 includes identifying friction (e.g., a struggle event) using the collected data. Identifying friction can include using the collected data to determine whether and what kind of issue exists with the digital experience. Identifying friction can include identifying struggles. As described herein, a friction and a struggle event can be used interchangeably.

A struggle can be an incident associated with a behavior trigger in which a user's intended action is not completed.

Struggles can be subcategorized, such as into forced struggles, knowledge struggles, deferred struggles, other struggles, or combinations thereof.

FIG. 3 illustrates an example forced struggle and associated data. A forced struggle can be indicative of a situation in which the user is forced from completing a task due to experiencing an unexpected action (e.g., an error message). In an example, a forced struggle can be automatically determined when the associated system response is an error message visible to the user.

FIG. 4 illustrates an example knowledge struggle and associated data. A knowledge struggle can be a struggle in which the user lacks knowledge to complete a task and fails an attempt to obtain information via a self-help method (e.g., using a do-it-yourself method to obtain help, such as using a virtual assistant or help center) to complete the desired action. A knowledge struggle can be automatically determined when, for example, accesses one or more help resources, and then is unable to receive help (e.g., receives no search results or requires more than a threshold number of searches to obtain help) or is nonetheless unable to complete a desired action despite receiving help. In some examples, the knowledge struggle is determined by the above process and then further detecting a preceding action that the user wanted to complete but could not.

FIG. 5 illustrates an example deferred struggle and associated data. A deferred struggle can be a struggle in which the user is deferred from completing a task because the user experiences confusion (e.g., a predictive intent does not occur). A deferred struggle can occur in any of a variety of ways. In an example, a deferred struggle can be detected by predicting a goal of the user for a session and then determining whether the goal was achieved before the session ended (or before a predetermined amount of time has elapsed). In some examples, the determination of the goal can be determined based on what user interface elements the user selects. For instance, if a user selects a "deposit check" user interface element, then it can be reasonably predicted that the user intends to deposit a check. In some examples, a grace period may exist to exclude erroneous input from consideration (e.g., the user intended to click on "account balance" but accidentally clicked on "deposit check" and quickly backed out). But even erroneous input may be valuable diagnostic input and so, in certain implementations, may not actually be excluded from a deferred struggle or reclassified as a different kind of struggle. Then the system can track (e.g., based on metrics) whether the user achieved that goal within the predetermined session or amount of time. How close the user came to achieving the goal can be tracked and stored in relation to the struggle. For instance, the digital experience may have a certain amount of steps in a workflow for achieving a goal (e.g., listing an item for sale on an online market place) and the system can track how far the user may have proceeded through those steps. Further, the system can track how far within certain sub-steps the user proceeded. For instance, the goal of a user may be making a mortgage payment and the user may have gotten to a step where the user needs to fill out fields corresponding to: amount, pay to, and pay from. The system can detect that the user filled out the pay to and pay from fields, but did not fill out the amount before the predetermined amount of time elapsed. Such information can be stored in association with the struggle.

FIG. 6 illustrates an example mapping of a scenario within a digital experience screen 610 with potential struggles and associated data region 620. In some examples, possible struggles can be identified and set up in conjunction with the digital experience to assist in the identification of struggles. The digital experience screen 610 illustrates an example "Make a payment" screen that may appear as part of a digital experience provided by the server 150 (e.g., by executing the instructions 160) to the user device 100 for display to a user (e.g., as part of executing the instructions 112). The screen includes the ability of a user to select which amount to pay by actuating one or more user interface elements (e.g., corresponding to a minimum payment, a total current balance, a principal only amount, or another amount). The principal only and other amounts both further include text boxes though which the system can receive input from a user specifying that amount. The screen 610 further includes a deliver by date and a selector from which the user can select from which account the money will come from. The illustrated screen further includes labels 612 that would not be visible to a user in many examples. The labels 612 can, for example, correspond to the names of the user interface elements in the underling rendering or logic system of the digital experience. As seen below in the struggles and associated data region 620, the data and techniques for determining the struggle can reference the elements of the screen 610 using the labels.

The struggles and associated data region 620 of FIG. 6 provides a visual representation of various struggles and associated data. It will be apparent to one skilled in the art how to program a struggle detector based on this representation. The illustrated example illustrates three possible struggles associated with the bill pay event of screen 610, which has a specified URL and event type. The first struggle relates to the four choices labeled in association with the checkbox labels describing the radio selector (e.g., INPUT [checkbox-groupChoice<1-4>]) and relating to a user click action. The enumerated possible frustrations include one or more frustrations selected from the group consisting of: possible frustration, rage clicks, or input field frustrations. The second struggle relates to the three input fields labeled in association with the user interface elements for user-specified data (e.g., INPUT [input_USBPPC-1-3]). The enumerated possible frustrations include one or more frustrations selected from the group consisting of: possible frustration, rage clicks, or input field frustrations. The third struggle relates to the date picker (e.g., associated with DIV [date-input-container]). The enumerated possible frustrations include one or more frustrations selected from the group consisting of: possible frustration and rage clicks.

Returning to FIG. 3, following the identification of the friction, the flow of the method can move to operation 240.

Operation 240 includes remediating the friction. This can take any of a variety of forms. In some examples, remediating the friction can include logging the friction in a developer environment or support tool (e.g., an issue tracking system) such that the diagnostic platform can automatically add or resolve tasks associated with a struggle element of the digital environment. As an example, the diagnostic platform may detect user input indicative of struggle with respect to a digital environment or an aspect thereof. Next, the diagnostic platform can contact a product team associated with the digital environment or aspect. The contact can be done via a message (e.g., through email or an instant messaging platform, such as TEAMS or SLACK). In other examples, the diagnostic platform can create an issue on an issue tracking system of the associated developers. Such an issue may include information about the status of the issue (e.g., open or closed), the priority of the issue (e.g., low, medium, or high), any labels about the issue (e.g., defect), a link to associated tracking information (e.g., a link to an epic on JIRA), creation date, update date, and individuals assigned to the task. The issue can be placed in a backlog that is then prioritized and results in refinement. Then the solution is tested and released.

In some examples, remediating the friction can include updating the digital experience server instructions 160 to address the friction. In some examples, remediating the friction can include automatically increasing computing resources (e.g., computing resources to the server). Such a remediation can be useful when the friction indicates a potential slowdown or overload of the server.

In some examples, remediating the friction can include initiating a communication with the user to address the friction. The communication can occur through the same medium in which the struggle was detected (e.g., application or website) or via another channel (e.g., email, phone, text, or other ways). The communication can include a variety of content, such as acknowledging the friction, including an apology, offering to help in a different way (e.g., if the user struggled to deposit a check, then the communication could suggest a different way to achieve that action, such as visiting a branch or automated teller machine). In some examples, the communication can be close in time to when the friction occurred. In some examples, in addition or instead, the communication occurs after (e.g., in response to) the friction is addressed (e.g., after a server error is fixed or after a user interface has been updated).

Root Cause Detection of Struggle Events

As previously mentioned, digital experiences (e.g., digital user experiences) are increasingly prevalent in today's technologically advanced society. These experiences, often delivered through applications running on user devices, must meet user expectations in terms of functionality, ease of use, and robustness, among other factors. However, users may face challenges or struggles while interacting with these applications, creating a negative experience. For example, an application may take longer than expected to respond to user inputs, may not provide expected functionality, or may not provide feedback to the user about certain actions. In a conventional system, identifying these struggling events can be a complex and time-consuming task, as it requires programmers and developers to comb through tons of data related to user behavior, application state, and system responses.

Determining the root cause of struggle events (e.g., frictions) can be difficult. Frequently, the conditions leading up to a struggle event and the system responses to user inputs are complex and varied, making root cause analysis challenging. Furthermore, manually addressing a root cause of a struggle event, such as by modifying the application, can further delay resolution and worsen the user experience.

Therefore, there is a need for automated, real-time systems and methods for monitoring a digital experience accessible through a user device, identifying struggle events based on concurrent monitoring of the digital experience and the application's status, ascertaining the root cause of these struggles, and adjusting the application in accordance with the root cause to improve the digital experience and reduce user struggle.

Implementations of the systems and methods discussed herein overcome these technical deficiencies. Such implementation provide a method for automatically detecting struggle events for digital experiences, determining the root causes of the struggle events, and addressing or remediating struggle events. For example, a computer can monitor an application as the application interfaces with a user to provide the user with a digital experience. In doing so, the computer can concurrently monitor (i) interactions between a user device and a digital experience of a user accessing an application executing on the user device and (ii) a state of the application during the digital experience. While monitoring the application, the computer can detect or capture user inputs that the user provides into the user device. The computer can compare the user inputs to one or more criteria over time. The computer can determine the user is experiencing a struggle event with the application responsive to determining a criterion is satisfied. Further, responsive to determining the criterion is satisfied, the computer can determine the root cause of the struggle event by identifying one or more system responses (e.g., responses by the computer and/or application providing the digital experience) indicating a response of the application to the one or more user inputs or a current state of the application when the user provided the one or more user inputs. The computer can use the satisfied criterion and the system responses to determine a root cause of the struggle event. The computer can remediate the struggle event based on the root cause of the struggle event.

The computer can use a framework of templates to determine the root causes of struggle events. For example, the computer can store templates that correspond to or with different root causes for struggle events in memory. Each template may include one or more criteria and/or one or more system responses that need to be satisfied for the template to be satisfied. Responsive to determining a struggle event occurred based on one or more user inputs satisfying a criterion, the computer can determine which of the templates is satisfied based on the criterion that was satisfied and a system response indicating the current state of the application when the user provided the one or more user inputs and/or the response of the application to the one or more user inputs. The computer can determine the root cause of the struggle event by identifying the root cause that corresponds to the satisfied template.

The computer can be configured to address or remediate different types of struggle events. For example, a digital experience may involve struggle events associated with forced struggle events in which a user is forced from completing a desired task due to receiving an error and/or experiencing an unexpected action, a deferred struggle event in which a user is deferred from completing a desired task due to experiencing confusion and/or does not complete an expected step, or a knowledge struggle event in which a user lacks knowledge to complete a desired task and fails an attempt to obtain information to achieve the desired task. The computer can determine how to address the different types of struggle events based on the root causes of the struggle events. For example, root causes of forced struggle events can include errors in the configuration of the application or a lack of computer resources available for the digital experience. The computer can determine the root causes of such forced struggle events according to the templates that were satisfied to determine the root causes and remediate the struggle events, for example, by increasing the amount of resources that are available for the digital experience and/or by automatically generating code (e.g., using a large language machine learning model) and pushing the code to the user device to remediate the struggle event. The computer can address deferred and/or knowledge struggle events by initiating (e.g., automatically initiating) a communication session with the user device and communicating with the user accessing the user device through the struggle event. The computer can address or remediate different types of struggle events using any method.

Advantageously, by implementing the systems and methods described herein, a computer can identify and remediate struggle events experienced by users accessing an application in real time (e.g., while users are accessing digital experiences with the application). The computer can determine root causes of struggle events, such as a slow application programming interface call or an uncaught exception within the application and automatically adjust the application accordingly. In doing so, the computer can improve digital experiences with users and avoid having programmers and/or developers comb through mountains of data to initially detect the struggle events after the digital experiences have ended.

Figure 7:
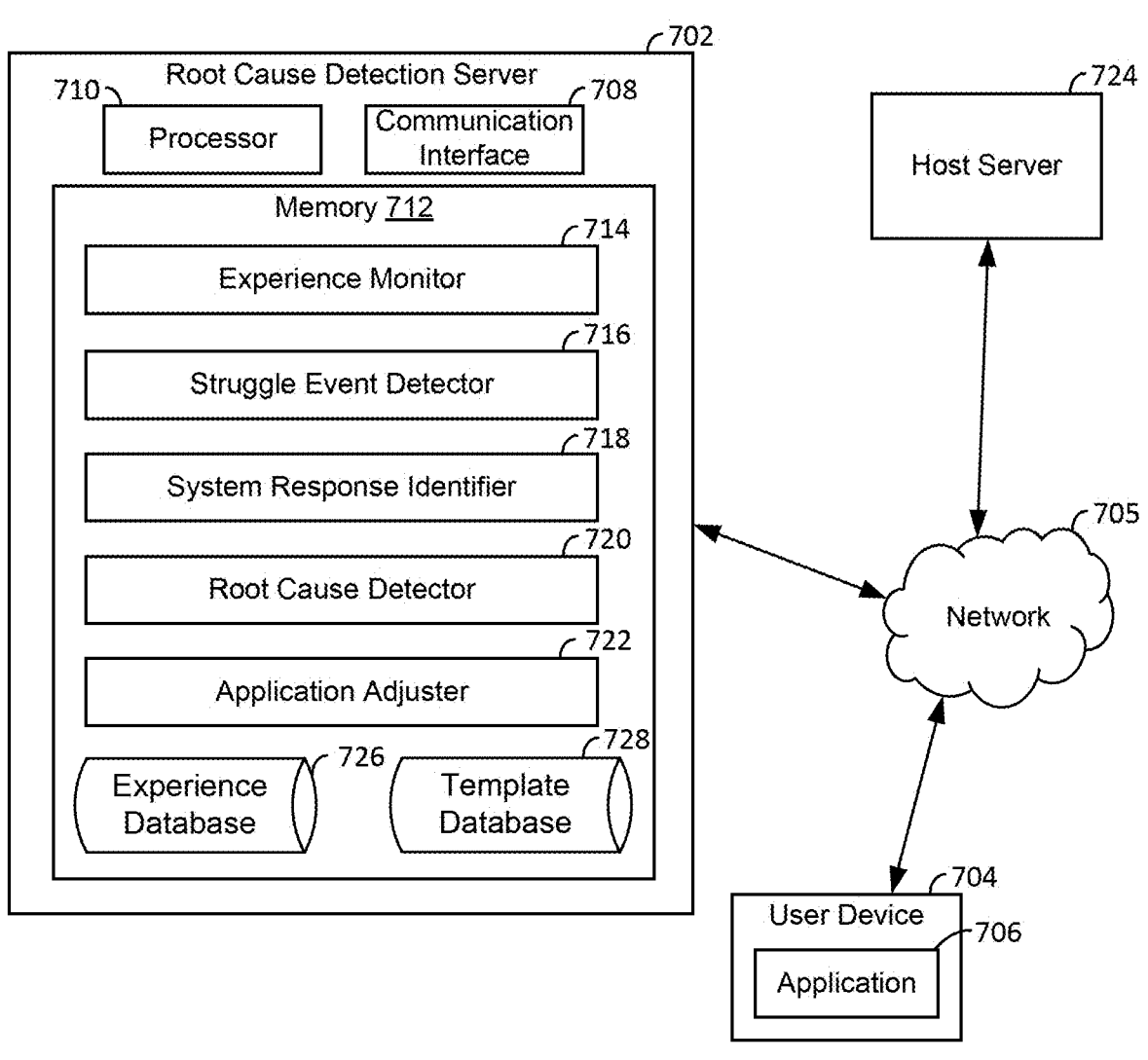
FIG. 7 illustrates an example system for root cause detection of struggle events with digital experiences, in accordance with an implementation.

For example, FIG. 7 illustrates an example system 700 for root cause detection of struggle events with digital experiences, in accordance with an implementation. In brief overview, the system 700 can include a root cause detection server 702 and a user device 704. The root cause detection server 702 can be the same as or similar to the digital experience server 150, shown and described with reference to FIG. 1. The user device 704 can be the same as or similar to the user device 100, shown and described with reference to FIG. 1. The root cause detection server 702 can be configured to monitor applications executed by different user devices that are providing digital experiences to users. Through the monitoring, the root cause detection server 702 can receive user inputs from an application executing on the user device 704. The root cause detection server 702 can determine the user inputs satisfy one or more criteria to determine a struggle event at the user device 704. Responsive to detecting the struggle event, the root cause detection server 702 can determine the current state of the application 706 and/or the processing by the application 706 in response to the user inputs that satisfied the criteria. The root cause detection server 702 can determine a root cause of the struggle event based on the criteria that were satisfied and the current state of the application 706 and/or the processing by the application 706 in response to the user inputs. The root cause detection server 702 can automatically remediate the struggle event based on the determined root cause of the struggle event. In this way, the root cause detection server 702 can remediate struggle events in real-time to improve the user experience of a user accessing an application. The system 700 may include more, fewer, or different components than shown in FIG. 7.

The root cause detection server 702, the user device 704, and/or a host server 724 can include or execute on one or more processors or computing devices and/or communicate via the network 705. The network 705 can include computer networks such as the Internet, local, wide, metro, or other area networks, intranets, satellite networks, and other communication networks such as voice or data mobile telephone networks. The network 705 can be used to access information resources such as web pages, websites, domain names, or uniform resource locators that can be presented, output, rendered, or displayed on at least one computing device (e.g., the root cause detection server 702 and/or the user device 704), such as a laptop, desktop, tablet, personal digital assistant, smartphone, portable computers, or speaker.

The root cause detection server 702, the user device 704, and/or the host server 724 can include (e.g., each include) or utilize at least one processing unit or other logic devices such as a programmable logic array engine or a module configured to communicate with one another or other resources or databases. As described herein, computers can be described as computers, computing devices, user devices, or client devices. The root cause detection server 702, the user device 704, and/or the host server 724 may each contain a processor and a memory. The components of the root cause detection server 702 and/or the user device 704 can be separate components or a single component. The system 700 and its components can include hardware elements, such as one or more processors, logic devices, or circuits.

The user device 704 can be an electronic computing device (e.g., a cellular phone, a laptop, or a tablet or any other type of computing device). The user device 704 can include a display with a microphone, a speaker, a keyboard, a touchscreen and/or any other type of input/output device. A user can view outputs of applications that are executing on the user device 704 on the display and/or provide inputs via the input/output devices of the user device 704. In one example, the user can view user interfaces that are output by the application 706 as the user device 704 executes the application 706.

The application 706 can be an application associated with a financial institution. The application 706 can operate as an interface between the user device 704 and the financial institution as the user device 704 executes the application 706. The application 706 can be or operate as an API for communication between the user device 704 and the root cause detection server 702. In some cases, the application 706 can facilitate communication between the user device 704 and the root cause detection server 702, for example. In some embodiments, the application 706 can be a browser application. As a browser application, the application 706 can access a website associated with the financial institution provided by the root cause detection server 702 or the host server 724. The application 706 can facilitate account management of accounts or profiles that a user of the user device 704 has with the financial institution. In a few examples, the user can use the application 706 to perform transactions at different point-of-sale devices, exchange values with other accounts with the same financial institution or a different financial institution, and/or otherwise make payments that are due with the financial institution. The application 706 can additionally enable the user to purchase different assets or obtain loans and make payments on the assets or loans. The user can provide inputs into the application 706 for these different types of uses and the application 706 can transmit the user inputs to the financial institution (e.g., to the root cause detection server 702). The financial institution can receive and/or store the inputs locally. The financial institution can update data of the account in a database based on the input (e.g., update the account to indicate payment is no longer due or that more needs to be paid).

The root cause detection server 702 can be configured to store data regarding different accounts of the financial institution. For example, the root cause detection server 702 may include a database that stores unique data structures for different accounts or profiles that the root cause detection server 702 stores for the financial institution. The accounts or profiles can store data (e.g., financial data) for the individuals that own or otherwise correspond with the accounts or profiles. The root cause detection server 702 can update the accounts or profiles as the users update the accounts or profiles with user inputs into the application 706, for example.

In some embodiments, the host server 724 (e.g., a different server than the root cause detection server 702) communicates with the application 706 to provide a digital experience to the user accessing the user device 704 and/or stores the database for the different accounts. In such embodiments, the root cause detection server 702 can retrieve data regarding the accounts and/or changes to the accounts and/or user inputs into the application 706 from the host server 724 to use to detect struggle events at the application 706 communicating with the host server 724. In some embodiments, the root cause detection server 702 may operate as an intermediary device that operates between the application 706 and the host server 724 for the financial institution. In such embodiments, the root cause detection server 702 may pass user inputs from the application 706 executing on the user device 704 to the host server 724 and the responses from the host server 724 to the application 706 executing on the user device. The root cause detection server 702 can analyze the responses and/or the user inputs to detect struggle events and/or determine the root cause of such struggle events. In some embodiments, the root cause detection server 702 can use network monitoring equipment to retrieve the data packets containing the user inputs and/or the responses from the network 705 as the user device 704 and the host server 724 communicate with each other. The root cause detection server 702 can access or retrieve the user inputs and/or responses to such user inputs in any manner.

The root cause detection server 702 may comprise one or more processors that are configured to provide a digital experience to a user accessing an application executing on the user device 704. The root cause detection server 702 may comprise a network interface 708, a processor 710, and/or memory 712. The root cause detection server 702 may communicate with the user device 704 via the network interface 708, which may be or include an antenna or other network device that enables communication across a network and/or with other devices. The processor 710 may be or include an ASIC (Application Specific Integrated Circuit), one or more FPGAs (Field Programmable Gate Arrays), a DSP (Digital Signal Processor), circuits containing one or more processing components, circuitry for supporting a microprocessor, a group of processing components, or other suitable electronic processing components. In some embodiments, the processor 710 may execute computer code or modules (e.g., executable code, object code, source code, script code, machine code, etc.) stored in memory 712 to facilitate the activities described herein. The memory 712 may be any volatile or non-volatile computer-readable storage medium capable of storing data or computer code.

The memory 712 may include an experience monitor 714, a struggle event detector 716, a system response identifier 718, a root cause detector 720, an application adjuster 722, an experience database 726, and/or a template database 728. In brief overview, the components 714-722 may monitor digital experiences that applications provide to users accessing different user devices. In doing so, the components 714-722 can monitor below the glass elements, such as application programming interface (API) functionality and above the glass components, such as user inputs into the applications received via user design functionality. The components 714-722 can detect a struggle event based on user inputs into an application satisfying a criterion. Responsive to detecting the struggle event, the components 714-722 can determine the state of the application and/or how the application responded to the user inputs that caused detection of the struggle event. The components 714-728 can determine a root cause of the struggle event based on the user inputs and/or the state or response of the application. The components 714-722 can automatically remediate the struggle event, such as by pushing code to the application to address the struggle event. Thus, the components 714-722 can address struggle events occurring at different user devices to improve the user experience of users accessing applications on different user devices.

The experience monitor 714 may comprise programmable instructions that, upon execution, cause the processor 710 to monitor a digital experience of a user accessing the application 706 executing on the user device 704. In doing so, the experience monitor 714 may be configured to concurrently monitor interactions between a user device and a digital experience of a user accessing an application executing on the user device, and a state of the application during the digital experience. For example, the root cause detection server 702 can be configured to provide the digital experience to the user accessing the user device 704. To do so, the root cause detection server 702 can communicate (e.g., via an API) with the application 706 to cause the application 706 to generate and/or update user interfaces based on inputs that the user inputs into the application 706. For example, the user can provide inputs into the application 706 to access the user's account stored by the root cause detection server 702. Based on or responsive to the inputs, the root cause detection server 702 can transmit data regarding the user's account to the application 706 that the application 706 can then display on a user interface displayed by the user device 704. The user can perform different actions for the account through the application 706 by providing user inputs (e.g., mouse clicks, keyboard strokes, etc.) into the application 706. The root cause detection server 702 can receive the inputs and transmit new data to the application 706 based on the inputs to cause the application 706 to update the user interface accordingly.

The experience monitor 714 can store each of the user inputs in the experience database 726. The experience monitor 714 can label the inputs with an identifier of the digital experience and/or timestamps indicating when the user input the user inputs, when the user device 704 transmitted the user inputs to the root cause detection server 702, and/or when the root cause detection server 702 (or the host server 724) received the user inputs. In some cases, the experience monitor 714 can identify the state of the application 706 and/or responses (e.g., the responses by the root cause detection server 702 and/or the host server 724) to the user inputs in response to receiving the user inputs. The experience monitor 714 can store the identified states and/or responses in the experience database 726 with timestamps indicating the times of the states and/or responses. The experience monitor 714 can store user inputs, responses, and/or application states in a record (e.g., a file, document, table, listing, message, notification, etc.) for the digital experience containing the identifier of the digital experience. By storing the data regarding the digital experience in this manner, the data can be associated with each other and therefore be used to detect struggle events and/or used to determine the root causes of such struggle events.

The experience database 726 can be a relational or graphical database configured to store data for individual digital experiences. For example, the experience database 726 can store individual records for each digital experience that the root cause detection server 702 provides to users through different applications. Each record can include an identifier of a unique digital experience between the user and an application in communication with the root cause detection server 702. A record can include indications of user inputs for a digital experience as well as system responses to such user inputs. The record can also include timestamps for the user inputs and/or system responses. By storing records in this way, the experience database 726 can enable struggle events to be detected and analyzed for root cause detection and/or remediation in real time and/or as historical data. In some examples, the experience database 726 or another database stores user interaction journeys through the digital experiences.

In some embodiments, the host server 724 may provide digital experiences to users through applications instead of the root cause detection server 702. In such embodiments, the host server 724 may store a database that includes account data for accounts and/or provide responses to user inputs to update or otherwise continue the digital experiences. In some embodiments, the experience monitor 714 can sniff or intercept the data packets including the user inputs and/or system responses from the communication between the user device 704 and the host server 724 to monitor the digital experience. In some embodiments, the root cause detection server 702 can operate as an intermediary communication device between the host server 724 and the applications and identify the user inputs and/or system responses from the data packets while passing the data packets between the host server 724 and the applications. The experience monitor 714 can store user inputs and/or system responses in records in the experience database 726 as the applications and the host server 724 communicate for the digital experiences. The data can be collected to represent the details of the scenario itself to be used for remediation (e.g., fixes by developers) and real time solutioning (e.g., for AI modeling).

The struggle event detector 716 may comprise programmable instructions that, upon execution, cause the processor 710 to detect struggle events of users accessing applications for which the experience monitor 714 is monitoring digital experiences. The struggle event detector 716 can detect a struggle event for the digital experience of the user accessing the application 706. The struggle event detector 716 can do so based on the user inputs that the user provides into the application 706. For example, while accessing the digital experience through the application 706, the user may provide one or more inputs. The experience monitor 714 can identify the one or more inputs and store the inputs in a record for the digital experience and/or in a cache in memory. The struggle event detector 716 can identify (e.g., from the record for the digital experience or otherwise from a cache in memory) the user inputs identified by the experience monitor 714. The struggle event detector 716 can compare the user inputs to one or more criteria (e.g., struggle event criteria) that, if satisfied, indicate a struggle event has occurred or is occurring. The struggle event detector 716 can determine a struggle event occurred at the user device responsive to determining the user inputs satisfied at least one of the one or more criteria. The struggle event detector 716 can compare inputs to the one or more criteria over time to automatically detect any number of struggle events of digital experiences at any number of applications in real-time and/or looking back at data of prior completed digital experiences.

In some embodiments, the struggle event detector 716 can determine a criterion is satisfied (e.g., detect a struggle event) based on clicks or taps into the application 706. For example, the struggle event detector 716 can determine at least a number (e.g., a predetermined number, as input by an administrator) of clicks or taps were input into or within a predetermined area of an element on a user interface within a predetermined time period. For instance, the struggle event detector 716 can determine a user selected a button or form on a user interface provided by the application 706 at least a number of times above a threshold within a predetermined time period (e.g., six seconds). Such inputs may be rage clicks and indicate that the user is frustrated with the digital experience or that the application is frozen and is not updating. In some cases, the struggle event detector 716 can similarly detect the struggle event based on keyboard strokes instead of clicks or taps. The button or form can be embedded on a page provided by the application. In some embodiments, the struggle event detector 716 may identify the element or area that the user clicked or tapped. The root cause detector 720 can use an identifier of the identified element or area as input to determine a root cause of struggle event.

In some embodiments, the struggle event detector 716 can determine a criterion is satisfied (e.g., detect a struggle event) based on whether a user completes a goal of a digital experience. For example, the struggle event detector 716 can determine a goal of the digital experience of the user accessing the application 706 based on a user input into the application 706. The goal may be, for example, to complete a deposit of a check. The struggle event detector 716 can determine the goal based on the user providing an input selecting a button that initiates the check deposit process or based on a text input by the user indicating a desire to deposit a check. The struggle event detector 716 can monitor the user inputs of the user participating in the digital experience. The struggle event detector 716 can detect an end to the session or the digital experience based on the user inputs and/or based on the connection between the application and the root cause detection server 702 or the host server 724 ending. Responsive to detecting the end of the session or the digital experience, the struggle event detector 716 can determine whether the goal was accomplished (e.g., whether the user successfully deposited the check), such as based on inputs that the user provided into the application 706 or states of the application 706 throughout the digital experience. The struggle event detector 716 can detect the struggle event responsive to determining the user device stopped executing the application without the goal being accomplished. In some embodiments, the struggle event detector 716 detects the struggle event responsive to the user not accomplishing the goal within a predetermined time period of the user input that the struggle event detector 716 used to determine the goal.

The system response identifier 718 may comprise programmable instructions that, upon execution, cause the processor 710 to identify system responses to user inputs at different applications monitored by the experience monitor 714. The system responses can, for example, indicate one or more responses of the application to the one or more user inputs or a current state of the application when the user provided the one or more user inputs. The responses of the application can be an update to the user interface or data for the application to include in an updated user interface displayed at the user device 704. For example, if the user requests to view a total value of the user's account, a response may be the requested total value and/or a user interface including the total value. The current state of the application can be or include one or more of a user interface state, a data state, a session state, an operation state, a network state, and/or a hardware state. The user interface state can be, include, or indicate what the user currently sees on their screen such as the data that is currently displayed, which screen or page is active, and/or the state of user interface elements like buttons, forms, or other controls. The data state can involve the data that is being used or manipulated by the application, which could be stored locally or retrieved from a server. The data state can include any unsaved changes, loaded data, and/or temporary data. The session state can be or include, for applications that require user login (e.g., the application 706), an indication of whether the user is logged in and/or interactions and/or preferences during the session. The operational state can indicate the internal workings of the application, such as running processes, memory usage, and other performance metrics. The network state can include information about network connectivity, data being transmitted, and/or communication with external servers or services, such as the root cause detection server 702 and/or the host server 724. The hardware state can include the status of device sensors, battery level, and/or other physical device criteria. The system response identifier 718 can identify any of such system responses for the digital experience.

In some embodiments, the system response identifier 718 can identify the system responses responsive to the struggle event detector 716 determining the user inputs for the digital experience satisfy the at least one criterion and/or otherwise detecting a struggle event at the user device 704 for the digital experience. Doing do can reduce the number of API calls for the system response identifier 718 to make to the host server 724 or the user device 704 and/or otherwise reduce processing resources for root cause detection of struggle events because the system response identifier 718 is not actively making requests at set time intervals or for every user input.

In some embodiments, the system response identifier 718 can identify the system responses of the struggle event by identifying the system responses from the record for the digital experience for which the struggle event detector 716 detected the struggle event. For example, the system response identifier 718 can identify the user inputs that the struggle event detector 716 used to detect the struggle event in the record for the digital experience. The system response identifier 718 can identify the system responses that were generated and/or transmitted to the application 706 in response to the identified user inputs that indicate the struggle event. In some cases, the system response identifier 718 can identify the system responses based on a stored association between the user inputs and system responses in the record that indicate the system responses were generated and/or transmitted in response to the user inputs. In some cases, the system response identifier 718 can identify the system responses based on the timestamps being sequentially after timestamps of the user inputs and/or within a time frame (e.g., a predetermined time frame, such as within six seconds, as input by an administrator) of the user inputs.

In some embodiments, the system response identifier 718 can identify the system responses in real-time based on the struggle event detector 716 detecting the struggle event at the application 706. For example, the struggle event detector 716 can detect the struggle event at the application 706 based on the user inputs satisfying a criterion. In response to the struggle event detector 716 detecting the struggle event, the system response identifier 718 can (e.g., immediately) query the application 706 to retrieve state information of the application 706. Such state information may indicate that the application is hanging or not updating based on the user inputs, for example. In some cases, the system response identifier 718 can identify the state of the connection between the application 706 and the root cause detection server 702 in response to the struggle event detector 716 detecting the struggle event. The system response identifier 718 can identify the struggle event in any manner responsive to the struggle event detector 716 detecting the struggle event.

In some embodiments, the system response identifier 718 can identify the current state of the application 706 based on how the application responded to a user input. For example, an expected response to an input into an element on a graphical user interface may be for the application to upload or present a new page. For example, if the user selects an option to purchase a loan from a user interface provided by the application 706, an expected response may be for the application 706 to present a new page corresponding to purchasing a loan. The system response identifier 718 can identify how the application 706 responded to selection of such an option to determine whether the application loaded a new page in response to the selection and/or whether the new page was the correct or expected page based on the selection. Responsive to determining the application 706 did not load a new page, the system response identifier 718 may determine the current state of the application is frozen. Responsive to determining the application 706 uploaded the incorrect page or an error message, the system response identifier 718 may determine the application 706 is in an error state.

In another example, the system response identifier 718 may determine the application 706 based on whether a graphical element on a page presented by the application 706 updated based on a user input. For example, a user may input a value into a form on a page presented by the application 706 with a key stroke. The system response identifier 718 may determine the form did not update to show the input value. In another example, the user may select a check box or form on a page presented by the application 706. The system response identifier 718 may determine the check box or form did not update to show the selection. In such cases, the system response identifier 718 may determine the application 706 is in an error state or a frozen state.

The root cause detector 720 may comprise programmable instructions that, upon execution, cause the processor 710 to determine (e.g., automatically determine) the root causes of struggle events at different applications. The root cause detector 720 can detect the root causes of struggle events in real-time as the experience monitor 714 monitors applications and the struggle event detector 716 detects the struggle events at the applications. Examples of root causes of struggle events can include, for example, uncaught exception, slow API call, lack of resources, deposit validation, etc. The root cause detector 720 can determine the root cause of a struggle event based on the user inputs that the struggle event detector 716 used to detect the struggle event and any system responses that the system response identifier 718 identified in response to the struggle event detector 716 detecting the struggle event. In doing so, the root cause detector 720 can analyze the user inputs and/or the system responses against templates corresponding to different root causes stored in the template database 728. The root cause detector 720 can determine a template that is satisfied based on the analysis and identify the root cause associated with the template to determine the root cause for the struggle event.

The template database 728 can be a relational or graphical database configured to store templates that correspond to different root causes of struggle events. The templates can be records that each describe a kind of interaction journey within the digital experience, which are stored in the template database 728. Each template can include a different combination or permutation of user inputs and/or system responses and a root cause. In some cases, the same root cause can correspond with different templates (e.g., different combinations of user inputs and/or system responses can correspond with the same root cause). A template can be satisfied by a struggle event if all or a defined portion or combination of user inputs and/or system responses from the template correspond with (e.g., were identified for) the struggle event. The root cause detector 720 can compare user inputs and/or system responses with the templates of the template database 728 to identify satisfied templates and, thus, identify root causes of struggle events of digital experiences detected by the struggle event detector 716.

The root cause detector 720 can detect the root cause of the struggle event based on the templates in the template database 728. For example, the root cause detector 720 can compare the user inputs that the struggle event detector 716 used to detect the struggle event and the system responses that the system response identifier 718 identified in response to the detection of the struggle event to individual templates stored in the template database 728. The root cause detector 720 can compare the user inputs and system responses to the templates in sequence until determining a template is satisfied or that no template is satisfied. Responsive to determining the user inputs and system responses do not satisfy any templates, the root cause detector 720 may generate an alert indicating no root cause could be determined and/or that a new system problem has been detected and transmit the alert to an administrator computer indicating the user inputs and/or the system responses to use for further diagnostics. However, responsive to determining a template is satisfied, the root cause detector 720 can identify the root cause of the satisfied template. The application adjuster 722 can automatically remediate or correct the struggle event based on the identified root cause of the struggle event.

In some cases, the templates of the template database 728 can include requirements other than data of user inputs and/or system responses. For example, the templates can include characteristics of the pages being displayed at computing devices, such as page name or uniform resource locator (URL) or the contents of the display, such as a video, image, or text. In another example, the templates can include product codes of an application being executed or through which a struggle event was detected. In some cases, a template can be satisfied based on one or more conditions, user inputs, system responses, behavior triggers, and/or event data. The templates can include any type of data regarding digital experiences. The root cause detection server 702 can collect such data responsive to detecting the struggle event and/or as the data is generated over the course of the digital experience and use the collected data to determine which, if any, templates are satisfied for a struggle event (e.g., by comparing the data to the templates).

In some embodiments, the root cause detector 720 can use a flow of a goal to determine a root cause of a struggle event. For example, different goals may correspond to different flows (e.g., action flows) of steps to take or that need to be taken to complete the goal. Responsive to the struggle event detector 716 determining the user did not complete the goal, the root cause detector 720 can identify the different steps that the user completed towards accomplishing the goal and/or the last step that the user completed. The root cause detector 720 can compare the identified steps (e.g., the number of the identified steps) and/or step to the templates relating to the goal (e.g., and not any other templates to reduce the processing resources that are required to determine the root cause). The root cause detector 720 can identify the template that corresponds to the identified steps and/or step to determine the root cause of the struggle event.

The application adjuster 722 may comprise program-mable instructions that, upon execution, cause the processor 710 to correct or remediate struggle events detected at different applications and/or user devices providing digital experiences to users. The application adjuster 722 can correct or remediate the struggle events based on the root causes that the root cause detector 720 determines for the struggle events. For example, the application adjuster 722 can store mappings of different root causes of struggle events to remediations for addressing the struggle events in memory (e.g., in a database). The application adjuster 722 can use the root cause for the struggle event as a key in a look-up to the mapping in the database to identify a reme-diation to address the struggle event.

In some cases, the application adjuster 722 can determine to generate code to resolve a struggle event (e.g., based on the look-up technique). The application adjuster 722 can generate such code to override an error message or to otherwise address other types of errors such as syntax errors, runtime errors, logical errors, semantic errors, compilation errors, linker errors, resource errors, concurrency errors, security errors, network errors, integration errors, user inter-face errors, database errors, environment errors, etc. The application adjuster 722 can generate the code by identifying the code from memory based on the code corresponding to the identified root cause or by using a large language machine learning model (e.g., a neural network or a trans-former trained to automatically generate text outputs based on text or other types of inputs), for example. When using the large language machine learning model, the application adjuster 722 can input the user inputs, the system responses, an identification of the struggle event, and/or an identifica-tion of the root cause determined for the struggle event into the large language machine learning model and execute the large language machine learning model. The application adjuster 722 can execute the large language machine learn-ing model based on the input to cause the large language machine learning model to output the code. The application adjuster 722 can push (e.g., transmit) the generated code to the application 706 or the user device 704 for execution to address the struggle event. The application adjuster 722 can push the generated code via a web hook of a plurality of webhooks or an API of a plurality of APIs that the applica-tion adjuster 722 selects based on the determined root cause. Other examples of such remediations are described above with respect to operation 240. The application adjuster 722 can remediate struggle events in any way based on the root causes of the struggle events.

In some embodiments, the application adjuster 722 can adjust the application 706 by increasing (e.g., automatically increasing) the computing resources that are available to the root cause detection server 702, or the host server 724, depending on which computer or server is providing or facilitating the digital experience at the user device 704, for providing the digital experience. For example, the root cause detection server 702 or the host server 724 may be config-ured to allocate a defined amount of computing resources (e.g., processing cores or memory resources) for individual digital experiences. The root cause detector 720 may deter-mine the struggle event at the user device 704 is because the root cause detector 720 or the host server 724 providing the digital experience does not have enough computer resources to provide the digital experience. Responsive to the deter-mination, the application adjuster 722 may allocate more computer resources for the digital experience for the root cause detection server 702 or the host server 724 to access to provide the digital experience for the user of the user device 704.

In some embodiments, the application adjuster 722 can adjust the application 706 by establishing or initiating a communication session with a user accessing the user device 704 for the digital experience. The application adjuster 722 can automatically initiate the communication session responsive to detecting the struggle event and/or responsive to determining a remediation of the struggle event is to initiate the communication session. The application adjuster 722 can initiate the communication session, for example, by initiating a chat interface through the application 706 that is presented on the user interface being displayed at the user device. Through the chat interface, the user accessing the user device 704 can provide inputs (e.g., text inputs) that the application 706 forwards to the root cause detection server 702 through the application 706. The root cause detection server 702 can automatically respond to the inputs by executing a large language machine learning model with the inputs from the chat interface as input and/or by connecting with an operator that can manually respond to the inputs.

Through the chat interface, the large language machine learning model or the operator may walk the user through steps of resolving the struggle event. The large language machine learning model or operator can do so, for example, by pointing to (e.g., identifying) different elements on the graphical user inputs to select or provide input to resolve the struggle event. In cases in which the struggle event is that the user does not understand what to provide as input or what a specific term means, the large language machine learning model or the operator may provide an applicable explanation through the chat interface. The user can read the explana-tions or instructions provided by the operator or the large language machine learning model through the chat interface and provide inputs into the application 706 accordingly. The application 706 may keep the chat interface on the user interface as the user provides the inputs into the application 706 and/or provides input into the chat interface such that the operator or large language machine learning model can guide the user through struggle event, such as to accomplish a goal (e.g., a goal that the struggle event detector 716 identified based on a previous user input during the digital experience).

In some embodiments, instead of initiating the commu-nication through the chat interface of the application 706 (e.g., through the same communication channel through which the application 706 is communicating with the root cause detection server 702), the root cause detection server 702 can initiate the communication session through a dif-ferent communication channel. For instance, responsive to determining to initiate a communication session with the user device 704, the root cause detection server 702 can initiate a text message (e.g., an SMS, MMS, or RCS message) or a phone call between the user device or a phone of the user accessing the user device 704 and an operator of the financial institution to guide the user through the struggle event, apologize for the struggle event, and/or suggest a way around the struggle event (e.g., suggest to visit a local branch of the financial institution).

In some embodiments, the root cause detector 720 may determine multiple templates that are satisfied based on data for a single struggle event. In such embodiments, the root cause detector 720 may identify the root cause that corre-sponds to each of the templates. The application adjuster 722 may identify the templates that are satisfied and identify a remediation for the multiple root causes from the mapping by identifying a remediation that corresponds to each of the root causes. The application adjuster 722 can perform or execute the identified remediation to address the struggle event with multiple root causes.

Figure 8:
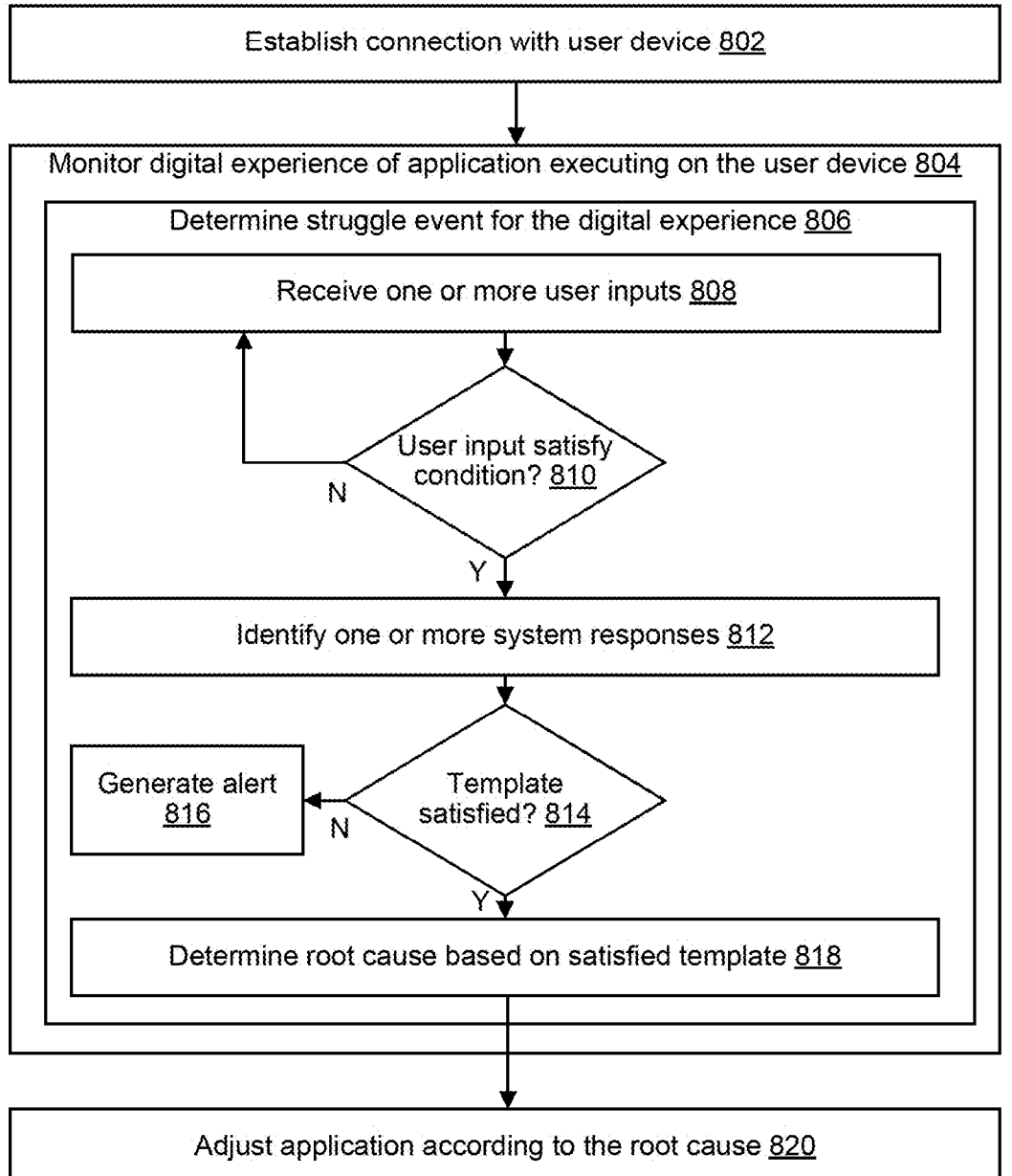
FIG. 8 illustrates an example method for root cause detection of struggle events with digital experiences, in accordance with an implementation.

FIG. 8 illustrates an example method 800 for root cause detection of struggle events with digital experiences, in accordance with an implementation. The method 800 can be performed by a data processing system (e.g., a client device or the user device 704, shown and described with reference to FIG. 1, the root cause detection server 702 or the host server 724, shown and described with reference to FIG. 7, a server system, etc.). The method 800 may include more or fewer operations and the operations may be performed in any order. One or more, or all, of the operations of the method 800 may be the same as or similar to the operations of the method 200, shown and described with reference to FIG. 2. Performance of the method 800 may enable the data processing system to automatically detect and/or remediate struggle events for a digital experience at a user device in real time and/or based on historical data. The method 800 can enable the data processing system to determine the root causes of such struggle events and use the root causes to determine how to address or remediate the struggle events. In this way, the data processing system can improve the experiences of users accessing an application in communication with the data processing system in real-time and/or identify common problems with the application to avoid for future users.

In the method 800, at operation 802, the data processing system establishes a connection with a user device. The data processing system can establish the connection with the user device through an application executing on the user device. The application can be or include an application programming interface configured to communicate with the data processing system. For instance, the data processing system may be associated with or correspond with a financial institution that stores and/or manages financial accounts of different users. The data processing system may store the accounts. The application can be associated with the same financial institution as the data processing system and enable users to access and/or perform actions with their accounts by communicating with the data processing system. The user device can execute the application and sign a user into the application based on login credentials provided by the user to access the user's account. The application and the data processing system can perform a hand-shake operation to establish the connection responsive to execution of the application by the user device. The data processing system can assign a digital experience number or value (e.g., a session number or value) to the connection responsive to establishing the connection. The user can request data regarding the user's accounts and/or request to perform actions with the financial institution through the connection by providing inputs into the application at the user device.

At operation 804, the data processing system monitors the digital experience of the application executing on the user device. The data processing system may monitor the digital experience by concurrently monitoring (i) interactions between the user device and the digital experience of the user accessing the application executing on the user device, and (ii) a state of the application during the digital experience (e.g., monitor above the glass user inputs and below the glass states of the application executing on the user device). The data processing system may monitor the digital experience by storing a record of the user inputs the user provides into the application during the digital experience in a database. The data processing system may also retrieve or identify the states of the application and include states in the record. The data processing system may include timestamps of the inputs and/or states in the record to indicate when the states and/or user inputs were input or otherwise identified. The data processing system may add user inputs and/or states of the application to the record over time to maintain a record of the digital experience that can be used to detect struggle events and root causes of the struggle events for remediation.

At operation 806, the data processing system determines or detects a struggle event (e.g., a friction) for the digital experience. A struggle event can be an indication of a problem that a user is having with a digital experience provided by the data processing system and/or an application interfacing with the data processing system. The data processing system can determine or detect struggle events based on one or more user inputs and/or system responses to such inputs.

For example, at operation 808, the data processing system receives one or more user inputs. The user inputs can be inputs that the user provides to the user device through an input/output device (e.g., a touch screen, a keyboard, a mouse, a microphone, etc.) connected to or in communication with the user device. Examples of such inputs can include clicks, taps, keyboard strokes, voice commands, and/or touches on a touch screen. The data processing system can receive or detect the one or more user inputs from the user device as the user accesses the user device or the application executing on the user device. The data processing system can store the user inputs in the record for the digital experience in a database in memory, in some cases with timestamps for the user inputs.

At operation 810, the data processing system determines whether the user inputs satisfy a criterion. For example, the data processing system can store different criteria in memory. The criteria can correspond with different sets of user inputs and/or characteristics of the user inputs. For example, a criterion may be satisfied if the data processing system determines a number or count of user inputs exceeding a threshold are input into a defined area (e.g., the entirety or a defined portion) of an element (e.g., a button or form) of a user interface. Other examples of criteria may be the user exiting out of the application before completing a goal, the user not completing a goal within a defined time period of an input indicating the goal, a define time period elapsing between user inputs, etc. The data processing system can compare user inputs to each of such criteria over time during the digital experience.

Responsive to determining one or more user inputs satisfy a criterion, at operation 812, the data processing system identifies one or more system responses. The system responses can be or include the current state of the application (e.g., the state of the application before and/or after receiving the user inputs satisfying the criterion), responses by the application to the user inputs, responses by the data processing system in communication with the application to provide the digital experience, etc. Examples of such system responses can be that the application is frozen or non-responsive to the inputs, that the application did not upload a new page (e.g., a page that corresponds with or that otherwise should have been uploaded) in response to the inputs, and/or that the user interface did not update in response to the user inputs. The data processing system can identify the system responses in response to determining the one or more user inputs satisfy the criterion by identifying the current state or response by the application to the user inputs and/or by identifying the current state or response by the data processing system to the user inputs.

At operation 814, the data processing system determines whether any templates are satisfied. The templates can each include a set of user inputs and/or a set of system responses. A template can be satisfied responsive to the data processing system identifying all or a defined portion of the set of user inputs and/or the set of system responses of the template. The data processing system can compare the user inputs and/or the system responses that the data processing system identifies based on the user inputs satisfying a criterion to the templates in sequence to determine whether any of the templates are satisfied. Responsive to determining none of the templates are satisfied, the data processing system can generate an alert indicating a root cause of the struggle event could not be determined. The alert can contain the user inputs, the system responses, and/or any other collected data regarding the struggle event. The data processing system can transmit the alert to an administrator computing device to enable an administrator to analyze the struggle event for immediate remediation and/or to avoid such struggle events in the future.

However, responsive to determining a template is satisfied by the user inputs and/or the system responses, at operation 818, the data processing system can determine the root cause of the struggle event. The data processing system can determine the root cause of the struggle event based on the template that the data processing system determined was satisfied by the user inputs and/or the system responses. For example, each template may include or otherwise indicate a root cause for a struggle event. The data processing system can identify the root cause of the satisfied template to determine the root cause of the struggle event.

At operation 820, the data processing system adjusts the application according to the root cause of the struggle event. The data processing system can adjust the application by pushing (e.g., transmitting) code for addressing or remediating the struggle event to the application. For example, the data processing system can input the user inputs and/or the system responses that were used to determine the root cause of the struggle event, as well as the root cause itself, into a large language machine learning model. The data processing system can execute the large language machine learning model based on the input. Based on the execution, the large language machine learning model can output code that can address the struggle event. The data processing system can push the code to the application. The user device can execute the code to reduce or cancel the struggle event. In another example, the data processing system can initiate or establish a communication session through the application or the user device or another through a different communication channel than the active communication channel between the application and the data processing system. The data processing system can use a large language machine learning model to communicate with the user through a chat interface of the communication channel to address the problem. In some cases, an operator can communicate through the chat interface or use another communication channel to communicate with the user. In this way, the data processing system can address struggle events in real time and/or otherwise improve users' experiences when interfacing with applications interfacing with the data processing system.

Figure 9:
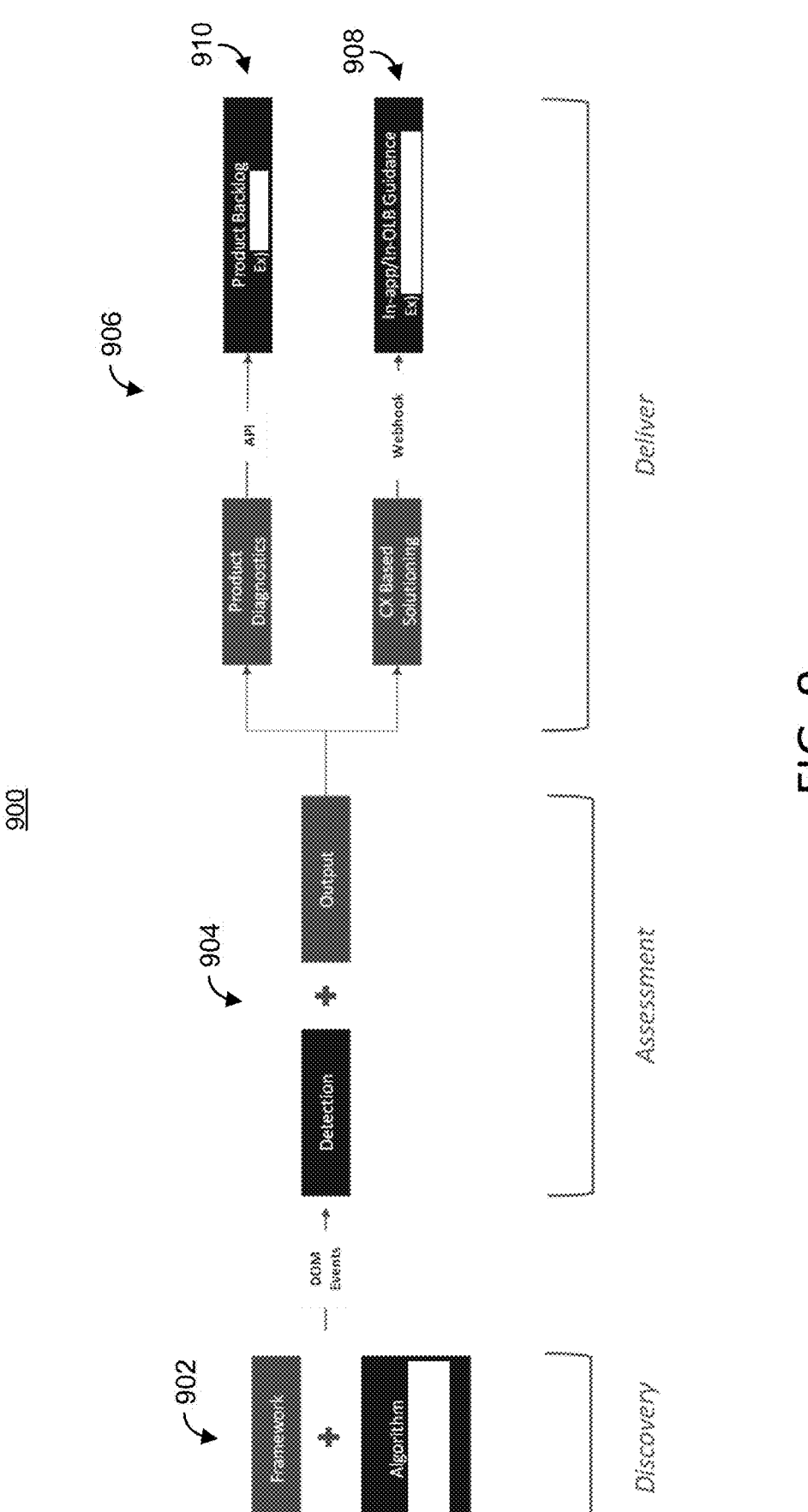
FIG. 9 illustrates an example sequence for root cause detection of struggle events with digital experiences, in accordance with an implementation.

FIG. 9 illustrates an example sequence 900 for root cause detection of struggle events with digital experiences, in accordance with an implementation. A data processing system (e.g., a client device or the user device 704, shown and described with reference to FIG. 1, the root cause detection server 702 or the host server 724, shown and described with reference to FIG. 7, a server system, etc.) can follow the sequence to detect struggle events of digital experiences of users accessing an application to communicate with the data processing system. In the sequence 900, at operation 902, the data processing system can apply a framework and/or algorithm to detect struggle events of digital experiences and/or root causes of the struggle events. At operation 904, the data processing system can determine a method of addressing or remediating the struggle events based on root causes of the struggle events. At operation 906, the data processing system can implement or deliver the method of addressing or remediating the struggle events by either resolving the struggle events in real-time 908 using a webhook and pushing code to the applications of the digital experiences to address the problems or initiating chat sessions or analyzing historical data 910 and remediating the issue so the problem does not happen in similar situations in the future.

Figure 10:
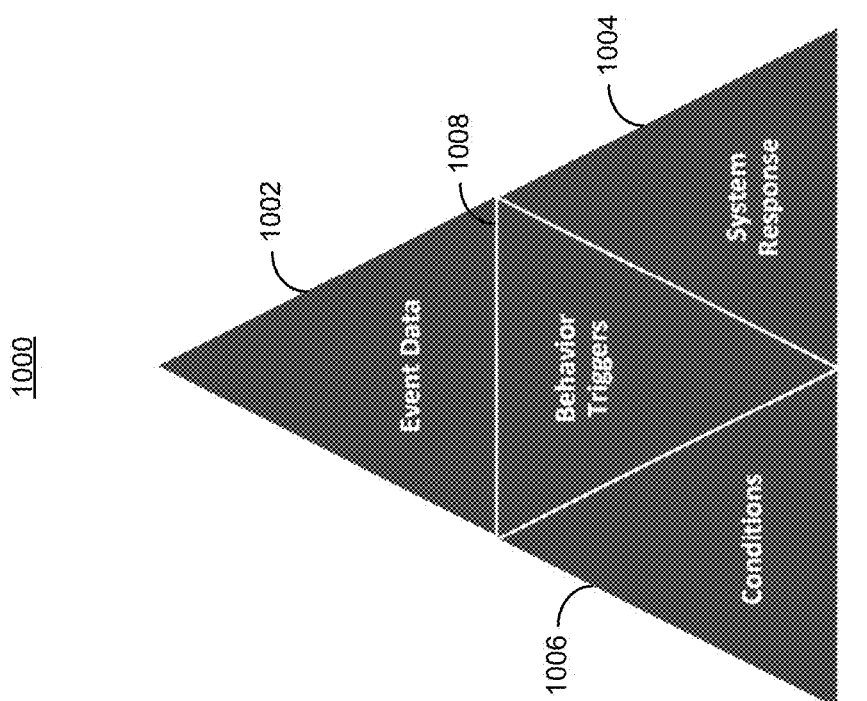
FIG. 10 illustrates an example framework for root cause detection of struggle events with digital experiences, in accordance with an implementation.

FIG. 10 illustrates an example framework 1000 for root cause detection of struggle events with digital experiences, in accordance with an implementation. The framework 1000 can include event data 1002, system responses 1004, conditions 1006, and/or behavior triggers 1008. The event data 1002 can be or include user inputs and/or the data about the application being monitored. For example, the event data 1002 can include page name, user flow, click activity, etc. The system responses 1004 can include responses by the application or the server hosting or in communication with the application. For example, the system responses 1004 can include error clicks and/or error messaging and defects. The conditions 1006 can indicate conditions or metadata regarding struggle events. For example, the conditions 1006 can include product code, timestamps, and/or uniform resource locators (URLs). The behavior triggers 1008 can be or include struggle events or indications of struggle events. Examples of behavior triggers 1008 can include rage clicks, possible frustration, input field frustration, and/or page/field stagnation. Together, the event data 1002, system responses 1004, conditions 1006, and/or behavior triggers 1008 can make up or include data about struggle events. The data can be used to create session replays for further diagnostics, in some embodiments.

FIG. 11A illustrates an example template 1100 for struggle event detection, in accordance with an implementation. The template 1100 can indicate a root cause when specific conditions, event data, behavior triggers, and/or system conditions have occurred. A data processing system (e.g., a client device or the user device 704, shown and described with reference to FIG. 1, the root cause detection server 702 or the host server 724, shown and described with reference to FIG. 7, a server system, etc.) can determine a root cause of a detected struggle event (e.g., a struggle event detected based on user inputs and/or any of the data of the template 1100) based on the template 1100 being satisfied. For instance, the data processing system can determine the template 1100 is satisfied responsive to determining each of the conditions of the template 1100 is present, the event data of the template 1100 is present, at least one of the behavior triggers is present, and the system response is present. Responsive to determining the template 1100 is satisfied, the data processing system can identify the root cause (e.g., uncaught exception, slow API call, deposit validation, etc.) of the struggle event to be the root cause associated with the template 1100.

FIG. 11B illustrates an example analysis 1102 of struggle events detected using the systems and methods described herein, in accordance with an implementation. A data processing system (e.g., a client device or the user device 704, shown and described with reference to FIG. 1, the root cause detection server 702 or the host server 724, shown and described with reference to FIG. 7, a server system, etc.) can generate the analysis 1102 by analyzing struggle events over time and aggregating data regarding the struggle events into a record. The analysis 1102 can include indications of different root causes of problems users have with a particular process or flow (e.g., steps for obtaining a goal). For instance, the analysis 1102 can include an analysis of root causes of problems involved with users applying for a Demand Deposits Account or checking/savings products. The data processing system can identify satisfied templates that correspond with struggle events of flows for goals involving applications for DDA support through the application and/or the data processing system. The data processing system can aggregate the number of occurrences of struggle events compared with the number of digital experiences or sessions involving applications for DDA support to determine the data of the analysis 1102. For example, the data processing system can determine a percentage of occurrences of struggle events of the number of digital experiences involved with applying for DDA support, a percentage of sessions in which at least one of such struggle events occurred or was detected, and/or a percentage of users that experienced such struggle events. Additionally or instead, the data processing system can determine the ratios or percentages of the different root causes of the struggle events compared with each other and/or the ratios or percentages of the types of struggle events that the data processing system determines or detects. In some embodiments, the data processing system can perform the analysis 1102 for digital experiences that occur or end within a defined or predetermined time period (e.g., a time period input by a user or as configured by an administrator).

Figure 12:
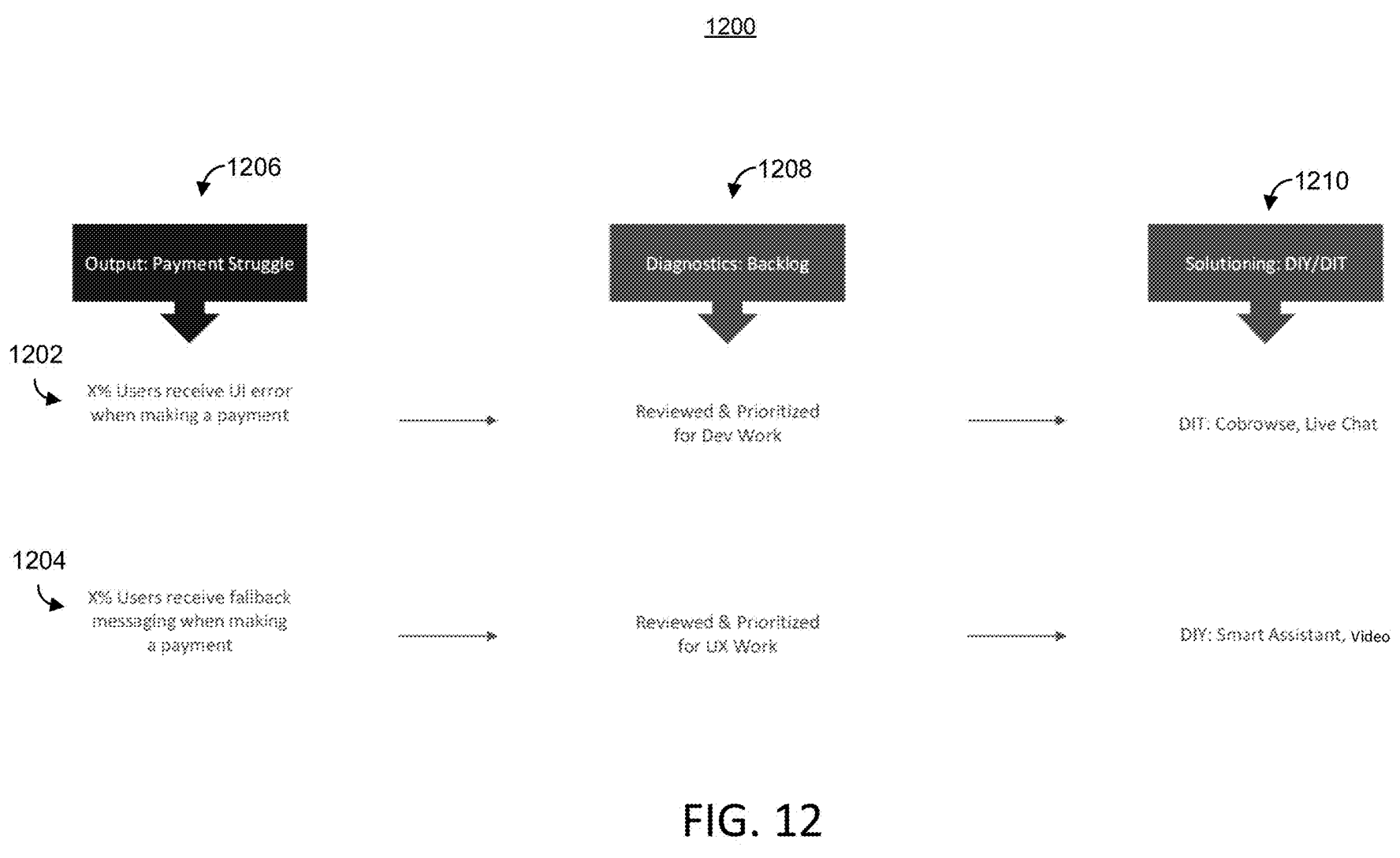

FIG. 12 illustrates an example sequences 1200 for root cause detection and remediation of struggle events with digital experiences, in accordance with an implementation. The sequence 1200 can include a sequence 1202 and a sequence 1204 that each correspond to detecting and remediating a struggle event of users attempting to make a payment. The sequences 1202 and 1204 can each include an operation 1206 of detecting the struggle event, an operation 1208 of performing diagnostics of determining how to remediate the struggle events, and an operation 1210 of remediating the struggle event. A data processing system (e.g., a client device or the user device 704, shown and described with reference to FIG. 1, the root cause detection server 702 or the host server 724, shown and described with reference to FIG. 7, a server system, etc.) can determine struggle events regarding individuals attempting to make payments. At operation 1206, the data processing system can identify users that struggle to make payments due to user interface errors in the sequence 1202 and users that struggle to make payments due to receiving fallback messaging from the data processing system in the sequence 1204. At the operation 1208, the data processing system can analyze the data regarding the different types of errors to determine the causes of the struggle events. In some cases, the data processing system can analyze the data by doing session replays to determine what the problems were and/or any templates that may have been satisfied by the sessions that resulted in the struggle events. At operation 1210, the data processing system can determine how to resolve the problem by either using a "do-it-together" approach in which a live chat window opens at the users' user devices and an operator communicates with the users to resolve the struggle events or a "do-it-yourself" approach in which the data processing system pushes code to the application through which the user is attempting to make the payments or a virtual assistant (e.g., a large language machine learning model or a rule-based engine) communicates with the user to resolve the struggle events.

Figure 13:
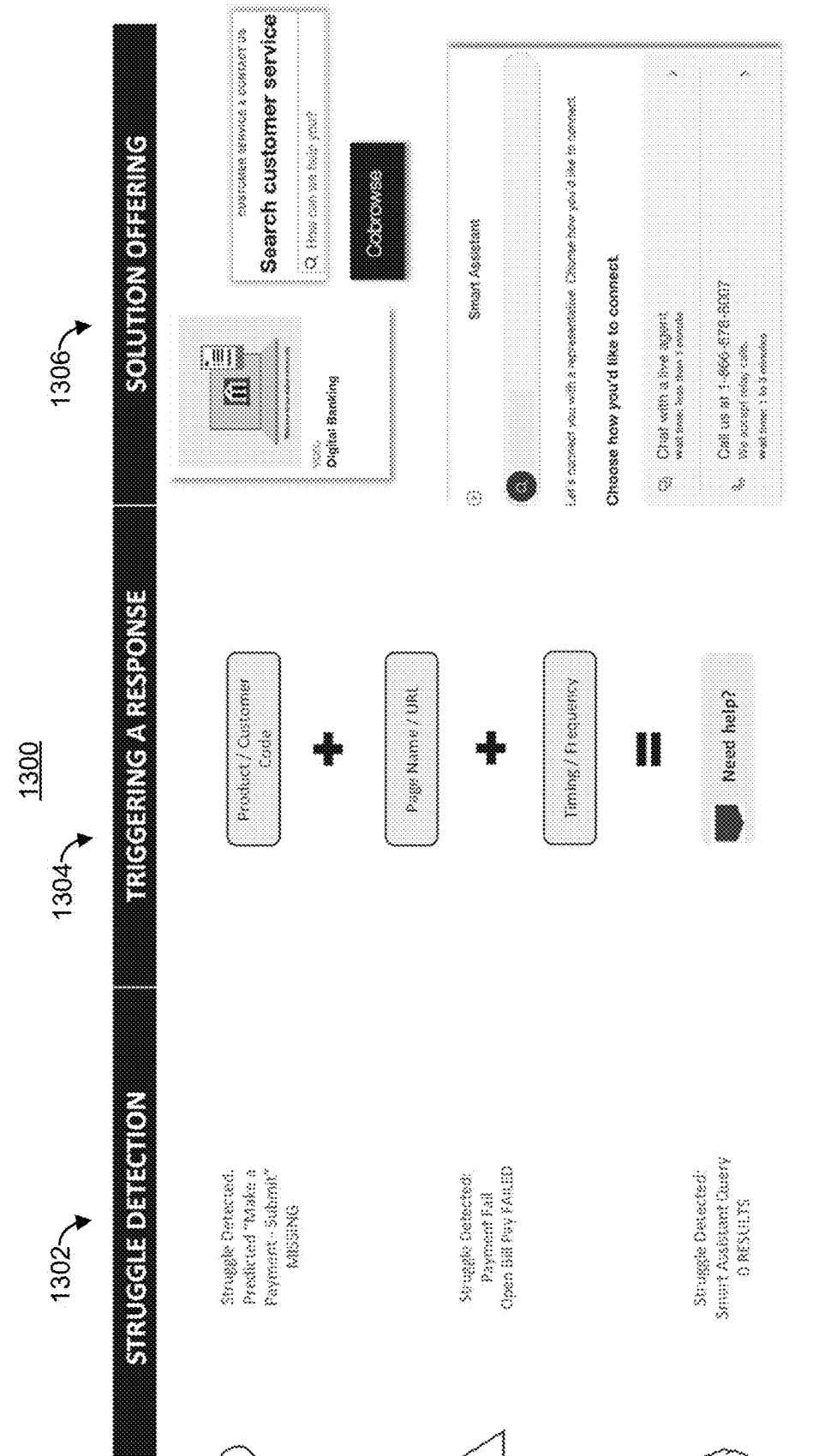
FIG. 13 illustrates an example sequence for root cause detection and remediation of struggle events with digital experiences, in accordance with an implementation.

FIG. 13 illustrates an example sequence 1300 for root cause detection and remediation of struggle events with digital experiences, in accordance with an implementation. The sequence 1300 can involve a data processing system (e.g., a client device or the user device 704, shown and described with reference to FIG. 1, the root cause detection server 702 or the host server 724, shown and described with reference to FIG. 7, a server system, etc.) determining struggle events of users accessing an application in communication with a server (e.g., the data processing system) of a financial institution. In an operation 1302 of the sequence, the data processing system can determine struggle events such as a user not selecting an expected or predicted button (e.g., not completing a goal), a payment failure, and a virtual assistant query that resulted in zero results. The data processing system can determine the struggle events based on the user inputs the user provides into the application. In an operation 1304, the data processing system can identify response triggers and/or system responses based on the detected struggle events. The data processing system can compare the collected data regarding the respective struggle events to different templates to determine root causes of the struggle events and/or remediations for the struggle events. At operation 1306, the data processing system can operate to remediate the struggle events, such as by opening a chat interface with the user, pushing code to remediate the struggle events to the applications or user devices accessed by the users, and/or opening a communication through email or phone for communication regarding the struggle events. In this way, the data processing system can operate to detect and/or remediate the struggle events in real-time.

FIG. 14 illustrates example struggle types 1400, in accordance with an implementation. As depicted in FIG. 14, examples of different struggle types include forced struggle events, deferred struggle events, and knowledge struggle events. Forced struggle events can be struggle events in which a user is forced from completing a desired task due to receiving an error and/or experiencing an unexpected action. Indications of forced struggle types can include, for example, error messages that a data processing system (e.g., a client device or the user device 704, shown and described with reference to FIG. 1, the root cause detection server 702 or the host server 724, shown and described with reference to FIG. 7, a server system, etc.) transmits to an application, a frustrated input, and/or a rage click. Deferred struggle events can be struggle events in which a user is deferred from completing a desired task due to experiencing confusion and/or does not complete an expected step. Examples of deferred struggle events can include predicted intent does not occur (e.g., a determined goal was not accomplished), page/field stagnation, errors, etc. Knowledge struggle events can be struggle events in which a user lacks knowledge to complete a desired task and fails an attempt to obtain information via do-it-yourself methods to achieve the task. Examples of knowledge struggle events can include failed attempts to use do-it-yourself channel (e.g., a chat interface provided by the data processing system for communication with users), page/field stagnation, and error messages. The data processing system can detect any different types of struggle events.

FIG. 15 illustrates example templates 1500 for detecting different struggle types, in accordance with an implementation. In the example illustrated in FIG. 15, a template 1502 of the templates can be a template for a forced or knowledge type struggle event. But templates can be applied to any of a variety of different struggle types. In an example, forced and knowledge struggle types use click history and rules based logic as part of associated templates. In another example, a deferred struggle type uses predictive intent. A data processing system (e.g., a client device or the user device 704, shown and described with reference to FIG. 1, the root cause detection server 702 or the host server 724, shown and described with reference to FIG. 7, a server system, etc.) can determine struggle events from the template 1502 when the user activity, action flow, user behavior, and system/platform behavior are each satisfied. A template 1504 of the templates can be a template for a deferred struggle event. The data processing system can use a predictive intent of a user (e.g., a determined goal based on inputs by the user) and determine whether the intent was completed. The data processing system can determine the template 1504 is satisfied responsive to determining the predicted intent was not completed.

FIG. 16 illustrates example templates 1600 for detecting different struggle types, in accordance with an implementation. A data processing system (e.g., a client device or the user device 704, shown and described with reference to FIG. 1, the root cause detection server 702 or the host server 724, shown and described with reference to FIG. 7, a server system, etc.) can determine a struggle event and/or a root cause of the struggle from a satisfied template of the templates 1600 when the data of the template is satisfied for a digital experience.

Behavior Intervention

Examples herein can further be used as part of behavior detection and intervention. Traditional models for engaging with users rely on general help dialogs that are not customized to the user. Further, such dialogs are often inconsistent across pages. These present user experience challenges and wasted computing resources. One or more of these challenges can be addressed by providing user-specific behavior detection and intervention.

In an example implementation, a system described herein can determine a cohort for a user or the user device based on one or more struggle events detected during a digital experience (e.g., using one or more techniques described herein). Then a cohort-specific help widget is displayed as part of the digital experience to the user device.

In addition to or instead of detecting and responding to a struggle, aspects herein can be used for predicting expected outcomes and intervening accordingly. For instance, expected outcomes of customers can be predicted based on behavioral cohort populations and their specific metric ranges/thresholds to identify customers in real-time and intervene with personalized help solutions based on the user's context, thereby changing the user's behavior from predicted outcome to a new directed outcome (a triggered action by the user).

The behavior of a user can be determined based on metrics data obtained from the user's interaction with the digital experience. In addition, cohort data about the user can be obtained or inferred. The cohort data can be data that usefully places the user within a cohort of similar users in a way that improves or is predicted to improve estimations of how the user will behave. In examples, the cohort data can be determined based on behavior of the user (e.g., based on an event or a series of events that the user experienced). In addition, it can be determined what triggered action is desired for a given user (e.g., customized to the user or the cohort to which the user belongs). Members of a cohort can be tracked based on a date that the user was first seen, a generated user ID for that user, webpage referral source (e.g., the webpage that linked to the site), tracking module parameters (e.g., source, medium, term, content, and campaign), other tracking data, or combinations thereof. Based on the obtained data, users can be placed into cohorts based on users that have recently done an event for the first time, who do the event regularly, who stopped doing an event recently, and users that have recently done an event after a break.

In examples, it can be determined how to reduce resource consumption (e.g., computing resource consumption) by a user by encouraging a user or cohort of users to perform a particular triggered action. In an example, a formula for determining an amount of resources saved is $E=A \times B \times C \times D$, where E represents an amount of resources conserved. In this equation, A can represent a cohort size—the estimated number of users that exhibit a particular behavior over a particular period of time. This estimate can be determined using metrics data. B can represent the estimated resource savings per user in the cohort. C can represent an estimated accuracy of predicting the behavior (e.g., as a decimal value between 0 and 1). D can represent an estimated conversion rate of users as expressed by a percentage of users that performed the triggered action (and thereby achieved the savings) as a result of intervention. The same or similar equation can be used in other contexts, such as to estimate business value.

In another example, an equation can be used to determine an actual resource savings (F), such as $F=G \times H \times I$. In the equation, G can represent a cohort size of an actual number of users that took the triggered action based on an intervention. The value of G can correlate to the value of C in the prior equation and the difference between C and G can represent an accuracy of the prediction and can be used to optimize future resource consumption or savings. The value of H can represent the value of the savings as a result of taking the triggered behavior and can correlate to or be the same as B above. The value of I can represent an actual number of customers that changed behavior as a result of the action as expressed as a percentage, which can correlate to the value D above.

As a specific example, the metrics data can reveal that a user dismisses random key modal (e.g., on a website web). Based on this, it can be inferred that the user is lost and is seeking help to complete a task. In an unresolved state, the user may waste computing or network resources attempting incorrect solutions or make a phone call to a customer support line (thus consuming additional resources). As a specific example, the system may detect that a user begins a virtual support session (e.g., by generating a 4 digit code associated with the session) but exit the session before a support representative joins. In response to detecting such an event, the system can provide specific assistance to help the user (e.g., selected based on assistance that helped users of a similar cohort on a same page).

In an example, one metric that can be used to predict the user behavior is time. Time can be used as a base measurement for identifying actionable or predictive behaviors based on a user behavioral profile and associated ranges or thresholds required to detect outliers (e.g., predict a user's future action). For instance, an amount of time that a user spends on a page or engaging in or abstaining from specific action while on the page can be a predictive signal determined by the metrics data that can be used to predict that a user is struggling or otherwise would benefit from intervention. As a specific example, if the time that a user spends on a page is more than a specific standard deviation from a mean user, then it can be determined that the user is struggling.

In an example, another metric that can be used to predict the user behavior is interaction journey. An interaction journey can be a representation of the flow of how the user navigated among pages, actions, or other logical parts of the digital experience. The interaction journeys of a large number of users can be aggregated to identify typical, good interaction journeys as well as atypical interaction journeys, as well as those interaction journeys that are associated with customer support calls or other undesired behavior. Using such good or bad outcomes and interaction journeys patterns, trends, and commonalties (e.g., a cohort profile based on both digital and transactional data sources) that can then be used to identify and predict a customers expected behavior. Thus, when a user is identified as having an interaction journey characteristic of a bad outcome, then intervention can be taken to attempt to return the interaction journey to a desired path. Further, where interaction journeys take into account interventions, known beneficial interventions can be attempted and known ineffective interventions can be avoided. Further, a specific interaction journey of a user can be applied used to determine whether the user is struggling and which kind of struggle type applies.

In yet another example, there is a method of determining behavioral profiles (e.g., habits) based on frequency of occurrences (e.g., digital or transactional) over time. For instance, predictive thresholds can be created that represent ranges of normalcy or abnormalcy based on behavioral profiles (cohorts) to detect anomalies when predicted or expected behavior does not occur. Examples, include aspects such as a number of users that have done an event a number of times, have done an event at all, have not done an event, have done a sequence of events, have an event property having a particular, minimum, maximum, average, or summed value. In addition or instead, the value can be a number of users that have done an event for the first time, have done the event regularly, have not recently done an event, or have recently done an event. Such data can be useful for predicting outcomes and whether intervention is desired. Such data can be used to place a user into a cohort or otherwise place the user into a relevant segment.

In examples, determining an appropriate action to be taken can be determined based on analyzing interaction journeys, replays, or other data associated with assistance sessions. Such data can reflect how other users in similar situations were helped and can benefit other users experiencing similar issues. Thus, there can be methods for determining appropriate action based off historical assistance data and gesture pattern recognition. The pathing data and associated support technician gestures can be used to identify appropriate help responses based on page and the historical journeys taken from that page when support sessions were used.

In an example system, there is a help manager that manages help interventions with a user session, such as via a help manager application programming interface. The help manager can update a help widget user interface element. For example, the help widget can be a popup user interface element that presents a menu of user selectable options for receiving help. Example help options can include a virtual assistant, help articles, virtual assistant deep links, virtual assistant short cuts, field-level assistance, goal setting, tours within the digital experience, onboarding flows, education materials, phone number with intelligent routing, a scheduled callback, a pre-authenticated call, coaching, appointment scheduling, help screen sharing, video calls, other help, or combinations thereof. Different levels of help can require different levels of resources to complete them. In examples, the help widget user interface can be always present or present itself in response to detecting that a user may need help, such as using any of the techniques described above. Further, the help options presented can be customized based on the techniques described above. Thus, while there may be many different help options available, screen real estate or other factors may practically limit the number of help options that can be displayed at a given time. Systems herein can intelligently select help options to present to the user to help the user at the appropriate time as well as reduce resource consumption. In an example, the system can further include a chat decision engine that can provide chat decisioning, as well as a message adapter. These components of the system can communicate with each other according to aspects described herein. The help manager can also be used to provide relevant assistance to a user experiencing a struggled. For example, aspects of struggle detection described above can use a webhook to prompt or otherwise provide a help widget to customers responsive to determining or predicting that the user is struggling.

In examples, the system can be based on behavioral data, such as digital history, databasing, and cohort modeling. Customer data can also be used, such as customer value, attrition risk, preferences, task status, product mix, resource consumption, other factors, or combinations thereof. Further, artificially intelligent decision can be used, such as cohort modeling or machine learning. Such can improve the ability of the user to interact with the system and the ability of the system to interact with the user in a useful way.

In examples, the interaction journey and other monitored behavior of the user can be converted into a text format (e.g., a summary or narrative description) and then used to prompt a generative artificial intelligence. For example, the generative artificial intelligence can be a text or audio chat bot accessible through the help widget to assist the user. The prompt can give the chat bot a head start in providing useful answers to the user.

In an example, there can be a predetermined flow that determines what actions to take when. Examples treatments (e.g., responses) to detected behavior for different given page types having a given URL are provided in the table below:

| Page | Page Type | Detected Behavior | Treatment examples |
|------|-----------|-------------------|--------------------|
| URL1 | Marketing Page | Search Engine Referral | Offer product consultation Phone # |
| URL2 | Online Banking servicing | Search Engine Referral | Offer Contextual FAQ |
| URL3 | New product application | Received input error (e.g., forced struggle) | Offer invitation to screen share for assistance |
| URL4 | Online Banking enrollment | Received input error (e.g., forced struggle) | Offer enrollment support phone number |
| URL5 | New product application | Selected new client | Invite to chat |
| URL6 | New product application | Selected existing client | Appointment Scheduling |
| URL7 | Online Banking enrollment | Repeated visits | Contextual-specific virtual assistant |
| URL8 | Login | Repeated visits | Offer technical support |

-continued

| Page | Page Type | Detected Behavior | Treatment examples |
|------|-----------|-------------------|--------------------|
|      | Assistance |                  | Phone number |

In one aspect, the present disclosure describes a system. The system can include one or more processors configured by machine-readable instructions stored in memory, wherein, upon execution, the machine-readable instructions cause the one or more processors to: concurrently monitor (i) interactions between a user device and a digital experience of a user accessing an application executing on the user device, and (ii) a state of the application during the digital experience; and while monitoring the interactions between the user device and the digital experience and the state of the application during the digital experience: determine one or more struggle events for the digital experience based on the concurrent monitoring, wherein determining the one or more struggle events includes, for each of the one or more struggle events: determining one or more user inputs into the application satisfy one or more criteria; responsive to determining the one or more user inputs satisfy the one or more criteria, identifying one or more system responses indicating a response of the application to the one or more user inputs or a current state of the application when the user provided the one or more user inputs; and determining a root cause of the struggle event based on (i) the satisfied one or more criteria, and (ii) the response of the application to the one or more user inputs or the current state of the application when the user provided the one or more user inputs; and for each of the one or more struggle events, adjust the application according to the root cause determined for the struggle event.

In one aspect, the present disclosure describes a method. The method may include concurrently monitoring, by one or more processors, (i) interactions between a user device and a digital experience of a user accessing an application executing on the user device, and (ii) a state of the application during the digital experience; and while monitoring the interactions between the user device and the digital experience and the state of the application during the digital experience: determining, by the one or more processors, one or more struggle events for the digital experience based on the concurrent monitoring, wherein determining the one or more struggle events includes, for each of the one or more struggle events: determining, by the one or more processors, one or more user inputs into the application satisfy one or more criteria; responsive to determining the one or more user inputs satisfy the one or more criteria, identifying, by the one or more processors, one or more system responses indicating a response of the application to the one or more user inputs or a current state of the application when the user provided the one or more user inputs; and determining, by the one or more processors, a root cause of the struggle event based on (i) the satisfied one or more criteria, and (ii) the response of the application to the one or more user inputs or the current state of the application when the user provided the one or more user inputs; and for each of the one or more struggle events, adjust, by the one or more processors, the application according to the root cause determined for the struggle event.

In one aspect, the present disclosure describes non-transitory computer-readable media. The non-transitory computer-readable media can include instructions that, when executed by one or more processors, cause the one or more processors to: concurrently monitor (i) interactions between a user device and a digital experience of a user accessing an application executing on the user device, and (ii) a state of the application during the digital experience; and while monitoring the interactions between the user device and the digital experience and the state of the application during the digital experience: determine one or more struggle events for the digital experience based on the concurrent monitoring, wherein determining the one or more struggle events includes, for each of the one or more struggle events: determining one or more user inputs into the application satisfy one or more criteria; responsive to determining the one or more user inputs satisfy the one or more criteria, identifying one or more system responses indicating a response of the application to the one or more user inputs or a current state of the application when the user provided the one or more user inputs; and determining a root cause of the struggle event based on (i) the satisfied one or more criteria, and (ii) the response of the application to the one or more user inputs or the current state of the application when the user provided the one or more user inputs; and for each of the one or more struggle events, adjust the application according to the root cause determined for the struggle event.

An aspect of the present disclosure includes any method described herein. An aspect of the present disclosure includes any system described herein. An aspect of the present disclosure includes any apparatus described herein.

An aspect of the present disclosure includes a method. The method may include, while monitoring interactions between a user device and a digital experience: collecting data regarding the interactions, wherein collecting the data includes: determining one or more behavioral triggers associated with the interactions; determining event data associated with the interactions; determining one or more conditions associated with the interactions; and determining one or more system responses associated with the interactions; identifying a friction with the interactions using the collected data; and remediating the friction.

In some embodiments, determining the one or more behavioral triggers associated with the interactions includes: identifying a behavioral trigger selected from the group consisting of: a rage click, a possible frustration, an input field frustration, a page stagnation, a field stagnation, excessive reloads, a profane input, and a shaking of the device. In some embodiments, the one or more behavioral triggers include data regarding: an action taken by a user as determined by user input received from the user device; an element of the digital experience that was interacted with; and a nature of that interaction.

In some embodiments, determining the event data includes a description of an action flow associated with the behavioral trigger. In some embodiments, the one or more conditions include a condition selected from the group consisting of: a product code, a timestamp, and a uniform resource locator.

In some embodiments, the one or more system responses include a system response selected from the group consisting of: an error message displayed to the user, an internal error message, and an internal log. In some embodiments, identifying the friction includes identifying a forced struggle. In some embodiments, the identifying of the forced struggle is based at least in part on identifying a situation in which the user is forced from completing a task due to experiencing an unexpected action.

In some embodiments, identifying the forced struggle is in response to detecting the occurrence of an item from the group consisting of: a possible frustration, a frustration input, a rage click, and a long running spinner. In some embodiments, identifying the friction includes identifying a knowledge struggle. In some embodiments, identifying a knowledge struggle includes identify that a user lacks knowledge to complete a task and fails an attempt to obtain information via a self-help method.

In some embodiments, identifying the friction includes identifying a deferred struggle. In some embodiments, identifying the deferred struggle includes identifying that the user is deferred from completing a task because the user experiences confusion. In some embodiments, identifying the deferred struggle includes: predicting a goal of the user for a session; and determining that the goal was not achieved before the session ended or before a predetermined amount of time has elapsed. In some embodiments, identifying the friction with the interactions using the collected data includes identifying the friction based on a predetermined correspondence between possible struggles and elements of the digital experience.

In some embodiments, remediating the friction includes sending a communication to the user. In some embodiments, the communication is via a same communication medium as the one in which the struggle was detected. In some embodiments, the communication is via a different communication medium from the one in which the struggle was detected. In some embodiments, the communication includes an acknowledgement of the friction and an offer to help the user in a different way. In some embodiments, remediating the friction includes automatically logging the friction in a developer environment or support tool. In some embodiments, remediating the friction includes automatically sending a message to a product team associated with the digital experience, wherein the message is based on the collected data.

In some embodiments, remediating the friction further includes summarizing the collected data using a large language model to create a summary, wherein the message includes the summary. In some embodiments, remediating the friction further includes prompting a large language model to identify one or more designs or changes as an output, wherein the message includes at least a portion of the output. In some embodiments, remediating the friction includes automatically increasing or modifying computing resources associated with the digital experience.

Large Language Models and Generative Artificial Intelligence

Large language models can be used to implement or enhance aspects described herein. As discussed above, replays, logs, or other data of user interactions with the digital experience can be captured. Such data can be provided as input to a large language model with a prompt to summarize what occurred. Such a summary can be provided as part of the remediation (e.g., to developers to better understand the problem). Further, the large language model can be prompted to identify designs or other changes that may be implemented to address the struggle. In addition to or instead of designs, the large language model may be configured to (e.g., with appropriate prompts and contacts) generate code or instructions (or changes to code or instructions) that address the struggle. A large language model may be used to generate user-specific and struggle-specific messages to the user (e.g., in relation to the above communications).

Computing Environment

Figure 17:
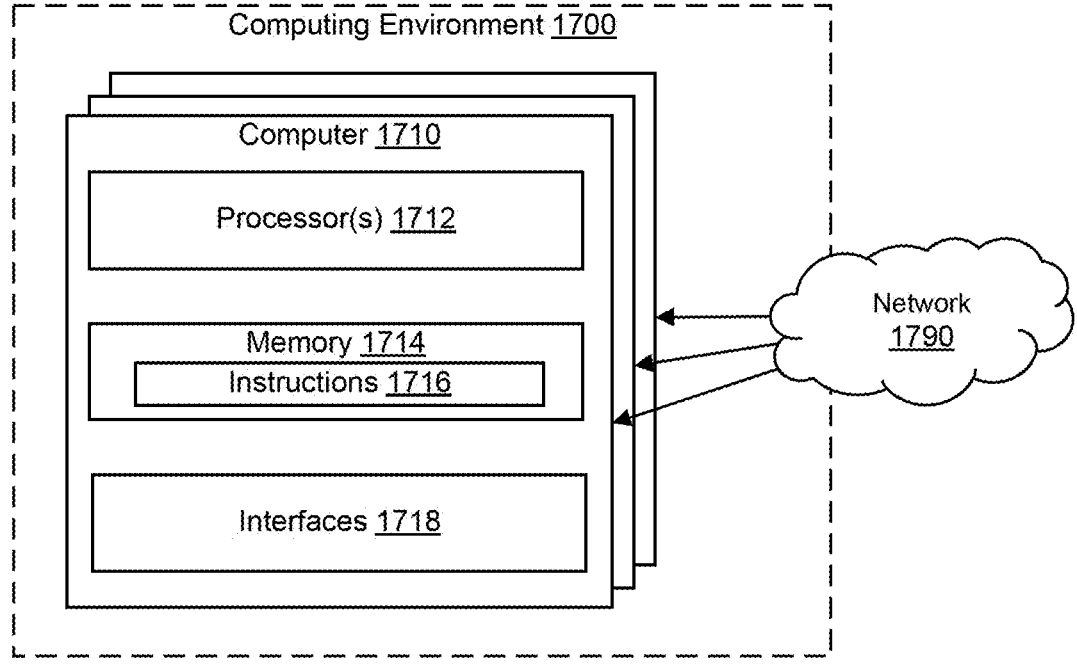
FIG. 17 discloses a computing environment in which aspects of the present disclosure may be implemented, in accordance with an implementation.

FIG. 17 discloses a computing environment 1700 in which aspects of the present disclosure may be implemented. A computing environment 1700 is a set of one or more virtual or physical computers 1710 that individually or in cooperation achieve tasks, such as implementing one or more aspects described herein. The computers 1710 have components that cooperate to cause output based on input. Example computers 1710 include desktops, servers, mobile devices (e.g., smart phones and laptops), payment terminals, wearables, virtual/augmented/expanded reality devices, spatial computing devices, virtualized devices, other computers, or combinations thereof. In particular example implementations, the computing environment 1700 includes at least one physical computer.

The computing environment 1700 may specifically be used to implement one or more aspects described herein. In some examples, one or more of the computers 1710 may be implemented as a user device, such as mobile device and others of the computers 1710 may be used to implement aspects of a machine learning framework useable to train and deploy models exposed to the mobile device or provide other functionality, such as through exposed application programming interfaces.

The computing environment 1700 can be arranged in any of a variety of ways. The computers 1710 can be local to or remote from other computers 1710 of the environment 1700. The computing environment 1700 can include computers 1710 arranged according to client-server models, peer-to-peer models, edge computing models, other models, or combinations thereof.

In many examples, the computers 1710 are communicatively coupled with devices internal or external to the computing environment 1700 via a network 1702. The network 1702 is a set of devices that facilitate communication from a sender to a destination, such as by implementing communication protocols. Example networks 1702 include local area networks, wide area networks, intranets, or the Internet.

In some implementations, computers 1710 can be general-purpose computing devices (e.g., consumer computing devices). In some instances, via hardware or software configuration, computers 1710 can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use.

Many example computers 1710 include one or more processors 1712, memory 1714, and one or more interfaces 1718. Such components can be virtual, physical, or combinations thereof.

The one or more processors 1712 are components that execute instructions, such as instructions that obtain data, process the data, and provide output based on the processing. The one or more processors 1712 often obtain instructions and data stored in the memory 1714. The one or more processors 1712 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 1712 include at least one physical processor implemented as an electrical circuit. Example providers processors 1712 include INTEL, AMD, QUALCOMM, TEXAS INSTRUMENTS, and APPLE.

The memory 1714 is a collection of components configured to store instructions 1716 and data for later retrieval and use. The instructions 1716 can, when executed by the one or more processors 1712, cause execution of one or more operations that implement aspects described herein. In many examples, the memory 1714 is a non-transitory computer readable medium, such as random access memory, read only memory, cache memory, registers, portable memory (e.g., enclosed drives or optical disks), mass storage devices, hard drives, solid state drives, other kinds of memory, or combinations thereof. In certain circumstances, transitory memory 1714 can store information encoded in transient signals.

The one or more interfaces 1718 are components that facilitate receiving input from and providing output to something external to the computer 1710, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input components, or combinations thereof (e.g., a touch sensitive display). The one or more interfaces 1718 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as according to WI-FI, cellular, BLUETOOTH, ZIGBEE, or other protocols). One or more of the one or more interfaces 1718 can facilitate connection of the computing environment 1700 to a network 1790.

The computers 1710 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries (e.g., libraries that provide functions for obtaining, processing, and presenting data), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT).

In some examples, large language models can be used to understand natural language, generate natural language, or perform other tasks. Examples of such large language models include CHATGPT by OPENAI, a LLAMA model by META, a CLAUDE model by ANTHROPIC, others, or combinations thereof. Such models can be fine tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

Machine Learning Framework

Figure 18:
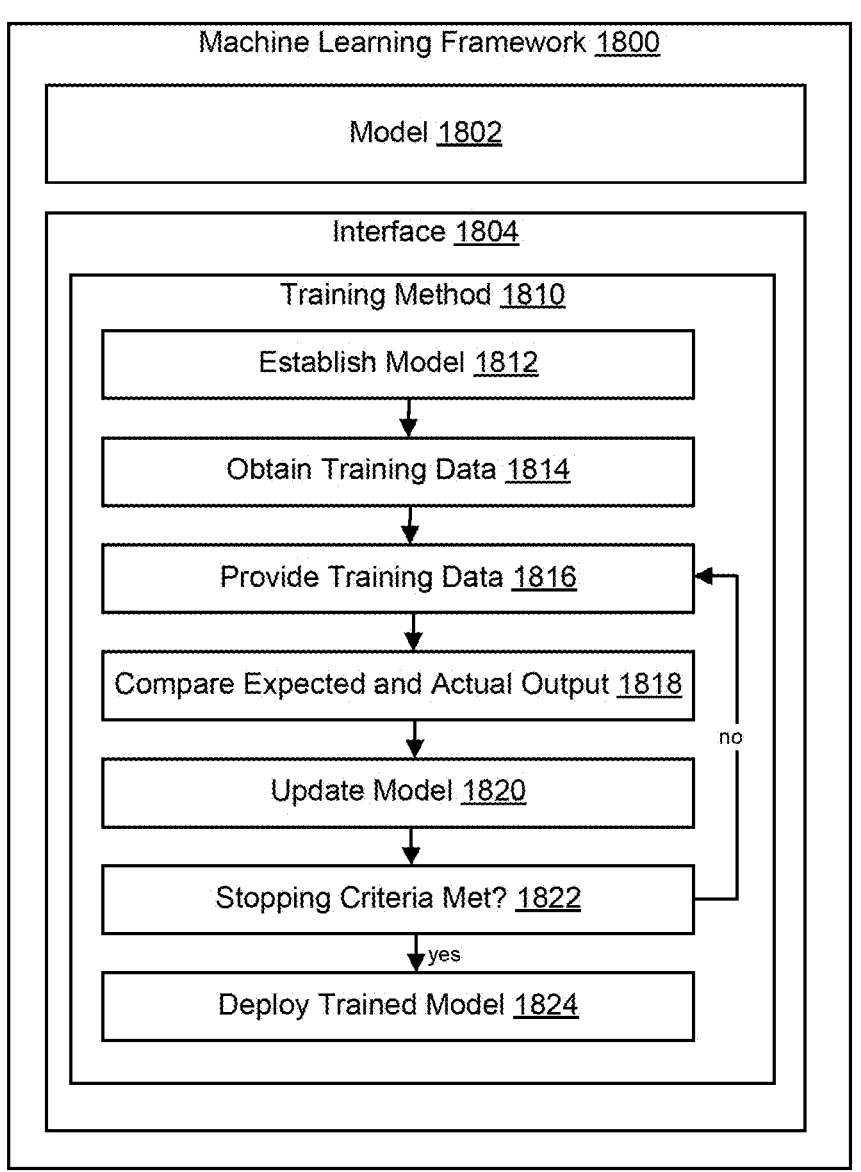

FIG. 18 illustrates an example machine learning framework 1800 that techniques described herein may benefit from. A machine learning framework 1800 is a collection of software and data that implements artificial intelligence trained to provide output, such as predictive data, based on input. Examples of artificial intelligence that can be implemented with machine learning way include neural networks (including recurrent neural networks), language models (including so-called "large language models"), generative models, natural language processing models, adversarial networks, decision trees, Markov models, support vector machines, genetic algorithms, others, or combinations thereof. A person of skill in the art having the benefit of this disclosure will understand that these artificial intelligence implementations need not be equivalent to each other and may instead select from among them based on the context in which they will be used. Machine learning frameworks 1800 or components thereof are often built or refined from existing frameworks, such as TENSORFLOW by GOOGLE, INC. or PYTORCH by the PYTORCH community.

The machine learning framework 1800 can include one or more models 1802 that are the structured representation of learning and an interface 1804 that supports use of the model 1802.

The model 1802 can take any of a variety of forms. In many examples, the model 1802 includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model 1802 can include a representation of memory (e.g., providing long short-term memory functionality). Where the set includes more than one model 1802, the models 1802 can be linked, cooperate, or compete to provide output.

The interface 1804 can include software procedures (e.g., defined in a library) that facilitate the use of the model 1802, such as by providing a way to establish and interact with the model 1802. For instance, the software procedures can include software for receiving input, preparing input for use (e.g., by performing vector embedding, such as using Word2Vec, BERT, or another technique), processing the input with the model 1802, providing output, training the model 1802, performing inference with the model 1802, fine tuning the model 1802, other procedures, or combinations thereof.

In an example implementation, interface 1804 can be used to facilitate a training method 1810 that can include operation 1812. Operation 1812 includes establishing a model 1802, such as initializing a model 1802. The establishing can include setting up the model 1802 for further use (e.g., by training or fine tuning). The model 1802 can be initialized with values. In examples, the model 1802 can be pretrained. Operation 1814 can follow operation 1812. Operation 1814 includes obtaining training data. In many examples, the training data includes pairs of input and desired output given the input. In supervised or semi-supervised training, the data can be prelabeled, such as by human or automated labelers. In unsupervised learning the training data can be unlabeled. The training data can include validation data used to validate the trained model 1802. Operation 1816 can follow operation 1814. Operation 1816 includes providing a portion of the training data to the model 1802. This can include providing the training data in a format usable by the model 1802. The framework 1800 (e.g., via the interface 1804) can cause the model 1802 to produce an output based on the input. Operation 1818 can follow operation 1816. Operation 1818 includes comparing the expected output with the actual output. In an example, this can include applying a loss function to determine the difference between expected and actual. This value can be used to determine how training is progressing. Operation 1820 can follow operation 1818. Operation 1820 includes updating the model 1802 based on the result of the comparison. This can take any of a variety of forms depending on the nature of the model 1802. Where the model 1802 includes weights, the weights can be modified to increase the likelihood that the model 1802 will produce correct output given an input. Depending on the model 1802, backpropagation or other techniques can be used to update the model 1802. Operation 1822 can follow operation 1820. Operation 1822 includes determining whether a stopping criterion has been reached, such as based on the output of the loss function (e.g., actual value or change in value over time). In addition or instead, whether the stopping criterion has been reached can be determined based on a number of training epochs that have occurred or an amount of training data that has been used. In some examples, satisfaction of the stopping criterion can include If the stopping criterion has not been satisfied, the flow of the method can return to operation 1814. If the stopping criterion has been satisfied, the flow can move to operation 1822. Operation 1822 includes deploying the trained model 1802 for use in production, such as providing the trained model 1802 with real-world input data and produce output data used in a real-world process. The model 1802 can be stored in memory 1714 of at least one computer 1710, or distributed across memories of two or more such computers 1710 for production of output data (e.g., predictive data).

Application of Techniques

Techniques herein may be applicable to improving technological processes of a financial institution, such as technological aspects of transactions (e.g., resisting fraud, entering loan agreements, transferring financial instruments, or facilitating payments). Although technology may be related to processes performed by a financial institution, unless otherwise explicitly stated, claimed inventions are not directed to fundamental economic principles, fundamental economic practices, commercial interactions, legal interactions, or other patent ineligible subject matter without something significantly more.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A system comprising:

one or more processors configured by machine-readable instructions stored in memory, wherein, upon execution, the machine-readable instructions cause the one or more processors to:

concurrently monitor (i) interactions between a user device and a digital experience of a user accessing an application executing on the user device, and (ii) a state of the application during the digital experience; and while monitoring the interactions between the user device and the digital experience and the state of the application during the digital experience:

determine one or more struggle events for the digital experience based on the concurrent monitoring, wherein determining the one or more struggle events includes, for each of the one or more struggle events:

determining one or more user inputs into the application satisfy one or more criteria;

responsive to determining the one or more user inputs satisfy the one or more criteria, identifying one or more system responses indicating a response of the application to the one or more user inputs or a current state of the application when the user provided the one or more user inputs; and determining a root cause of the struggle event based on (i) the satisfied one or more criteria, and (ii) the response of the application to the one or more user inputs or the current state of the application when the user provided the one or more user inputs; and for each of the one or more struggle events, adjust the application according to the root cause determined for the struggle event by executing a large language machine learning model using (i) the root cause of the struggle event, (ii) the satisfied one or more criteria, and (iii) the response of the application to the one or more user inputs or the current state of the application when the user provided the one or more user inputs as input to cause the large language machine learning model to output code for remediating the struggle event; and pushing the output code for remediating the struggle event to the user device via the application.

2. The system of claim 1, wherein the machine-readable instructions cause the one or more processors to:

determine the one or more user inputs into the application satisfy the one or more criteria by detecting at least a predetermined number of clicks or taps within a predetermined area of an element or form within a predetermined time period; and.

3. The system of claim 1, wherein the machine-readable instructions further cause the one or more processors to:

determine a cohort for the user device based on the one or more struggle events; and presenting a cohort-specific help widget as part of the digital experience to the user device.

4. The system of claim 1, wherein the machine-readable instructions cause the one or more processors to determine the struggle event by:

determining a goal of the digital experience based on a user input into the application; and determining the struggle event responsive to determining the user device stopped executing the application without the goal being accomplished.

5. The system of claim 4, wherein the machine-readable instructions cause the one or more processors to:

identify a flow of the goal of the digital experience from memory responsive to the user input into the application, the flow comprising one or more steps for completing the goal; and store a record of a number of the one or more steps that were completed during the digital experience prior to the user device stopping executing the application.

6. The system of claim 5, wherein the machine-readable instructions cause the one or more processors to determine the root cause of the struggle event based at least on the number of the one or more steps that were completed during the digital experience prior to the user device stopping executing the application.

7. The system of claim 1, wherein the machine-readable instructions cause the one or more processors to determine the struggle event by:

determining a goal of the digital experience based on a user input into the application; and determining the struggle event responsive to determining the goal was not accomplished within a predetermined time period of the user input into the application.

8. The system of claim 1, wherein the machine-readable instructions cause the one or more processors to:

identify the response of the application to the one or more user inputs by determining whether the application updated a page presented by the application based on the one or more user inputs.

9. The system of claim 8, wherein the machine-readable instructions cause the one or more processors to identify the response of the application to the one or more user inputs by determining whether a graphical element of the page updated based on the user inputs or that the application did not present a second page in response to the one or more user inputs.

10. The system of claim 1, wherein the machine-readable instructions cause the one or more processors to:

store a plurality of templates corresponding to different sets of criteria and system responses, each of the plurality of templates indicating a different root cause of a struggle event;

determine a template of the plurality of templates that is satisfied based on (i) the satisfied one or more criteria, and (ii) the response of the application to the one or more user inputs or the current state of the application when the user provided the one or more user inputs; and determine the root cause of the struggle event based on the root cause indicated by the satisfied template.

11. The system of claim 1, wherein the machine-readable instructions cause the one or more processors to determine the root cause of the struggle event by determining the root cause to be a slow application programming interface call or an uncaught exception with the application.

12. The system of claim 1, wherein the machine-readable instructions cause the one or more processors to adjust the application according to the root cause determined for the struggle event by initiating a communication session with a user accessing the user device for the digital experience.

13. The system of claim 12, wherein the machine-readable instructions cause the one or more processors to initiate the communication session by initiating the communication session via a different communication channel than the communication channel through which the one or more processors are concurrently monitoring (i) the interactions between a user device and a digital experience of a user accessing an application executing on the user device, and (ii) the state of the application during the digital experience.

14. The system of claim 12, wherein the machine-readable instructions cause the one or more processors to initiate the communication session by updating the digital experience to present a chat interface at the user device through the application.

15. The system of claim 1, wherein the machine-readable instructions cause the one or more processors to adjust the application according to the root cause determined for the struggle event by automatically increasing computing resources available for the one or more processors to access for the digital experience.

16. A method comprising:

concurrently monitoring, by one or more processors, (i) interactions between a user device and a digital experience of a user accessing an application executing on the user device, and (ii) a state of the application during the digital experience; and while monitoring the interactions between the user device and the digital experience and the state of the application during the digital experience:

determining, by the one or more processors, one or more struggle events for the digital experience based on the concurrent monitoring, wherein determining the one or more struggle events includes, for each of the one or more struggle events:

determining, by the one or more processors, one or more user inputs into the application satisfy one or more criteria;

responsive to determining the one or more user inputs satisfy the one or more criteria, identifying, by the one or more processors, one or more system responses indicating a response of the application to the one or more user inputs or a current state of the application when the user provided the one or more user inputs; and determining, by the one or more processors, a root cause of the struggle event based on (i) the satisfied one or more criteria, and (ii) the response of the application to the one or more user inputs or the current state of the application when the user provided the one or more user inputs; and for each of the one or more struggle events, adjust, by the one or more processors, the application according to the root cause determined for the struggle event by executing a large language machine learning model using (i) the root cause of the struggle event, (ii) the satisfied one or more criteria, and (iii) the response of the application to the one or more user inputs or the current state of the application when the user provided the one or more user inputs as input to cause the large language machine learning model to output code for remediating the struggle event; and pushing the output code for remediating the struggle event to the user device via the application.

17. The method of claim 16, wherein determining the one or more user inputs into the application satisfy the one or more criteria comprising detecting, by the one or more processors, at least a predetermined number of clicks or taps within a predetermined area of an element within a predetermined time period.

18. Non-transitory computer-readable media comprising instructions that, when executed by one or more processors, cause the one or more processors to:

concurrently monitor (1) interactions between a user device and a digital experience of a user accessing an application executing on the user device, and (ii) a state of the application during the digital experience; and while monitoring the interactions between the user device and the digital experience and the state of the application during the digital experience:

determine one or more struggle events for the digital experience based on the concurrent monitoring, wherein determining the one or more struggle events includes, for each of the one or more struggle events:

determining one or more user inputs into the application satisfy one or more criteria;

responsive to determining the one or more user inputs satisfy the one or more criteria, identifying one or more system responses indicating a response of the application to the one or more user inputs or a current state of the application when the user provided the one or more user inputs; and determining a root cause of the struggle event based on (i) the satisfied one or more criteria, and (ii) the response of the application to the one or more user inputs or the current state of the application when the user provided the one or more user inputs; and for each of the one or more struggle events, adjust the application according to the root cause determined for the struggle event by executing a large language machine learning model using (i) the root cause of the struggle event, (ii) the satisfied one or more criteria, and (iii) the response of the application to the one or more user inputs or the current state of the application when the user provided the one or more user inputs as input to cause the large language machine learning model to output code for remediating the struggle event; and pushing the output code for remediating the struggle event to the user device via the application.

19. The non-transitory computer-readable media of claim 18, wherein the instructions cause the one or more processors to determine the one or more user inputs into the application satisfy the one or more criteria by detecting at least a predetermined number of clicks or taps within a predetermined area of an element within a predetermined time period.

* * * * *